US008462381B2

(12) United States Patent
Yamazaki

(10) Patent No.: US 8,462,381 B2
(45) Date of Patent: *Jun. 11, 2013

(54) DOT POSITION MEASUREMENT METHOD, DOT POSITION MEASUREMENT APPARATUS, AND COMPUTER READABLE MEDIUM

(75) Inventor: Yoshirou Yamazaki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 925 days.

This patent is subject to a terminal disclaimer.

(21) Appl. No.: 12/569,752

(22) Filed: Sep. 29, 2009

(65) Prior Publication Data

US 2010/0079774 A1 Apr. 1, 2010

(30) Foreign Application Priority Data

Sep. 30, 2008 (JP) ................................ 2008-253436

(51) Int. Cl.
*G06K 15/00* (2006.01)

(52) U.S. Cl.
USPC .................... 358/1.5; 347/78; 347/19; 347/9; 347/13; 358/1.1

(58) Field of Classification Search
USPC .............................. 358/1.5; 347/78, 9, 19, 13
See application file for complete search history.

(56) References Cited

U.S. PATENT DOCUMENTS

| | | | | |
|---|---|---|---|---|
| 8,139,269 | B2 * | 3/2012 | Goto et al. | 358/3.27 |
| 8,167,412 | B2 * | 5/2012 | Yamazaki | 347/78 |
| 2008/0211850 | A1 * | 9/2008 | Miyamoto et al. | 347/15 |
| 2008/0253607 | A1 | 10/2008 | Miyamoto et al. | |
| 2008/0309703 | A1 * | 12/2008 | Yamazaki | 347/19 |
| 2009/0085952 | A1 * | 4/2009 | Yamazaki | 347/19 |
| 2010/0079518 | A1 * | 4/2010 | Yamazaki | 347/9 |
| 2011/0085184 | A1 * | 4/2011 | Yamazaki | 358/1.5 |
| 2012/0250040 | A1 * | 10/2012 | Yamazaki | 358/1.8 |

FOREIGN PATENT DOCUMENTS

| | | | |
|---|---|---|---|
| JP | 2008-44273 | A | 2/2008 |
| JP | 2008-80630 | A | 4/2008 |

* cited by examiner

*Primary Examiner* — King Poon
*Assistant Examiner* — Lawrence Wills
(74) *Attorney, Agent, or Firm* — Birch, Stewart, Kolasch & Birch, LLP

(57) ABSTRACT

According to an aspect of the present invention, by correcting the measurement positions of each line block with a reference line block serving as a reference point, the effect of disruption of the read image lattice caused by the image reading apparatus can be diminished, whereby the effect of paper deformation can be reduced, making highly accurate dot position measurement possible.

18 Claims, 30 Drawing Sheets

DOT POSITION MEASUREMENT METHOD, DOT POSITION MEASUREMENT APPARATUS, AND COMPUTER READABLE MEDIUM

BACKGROUND OF THE INVENTION

1. Field of the Invention

The present invention relates to a dot position measurement method, a dot position measurement apparatus, and a computer readable medium, and more particularly to dot position measurement technique suitable for measurement of a deposition position of a dot recorded by each nozzle of an inkjet head.

2. Description of the Related Art

One method of recording an image onto a recording medium such as recording paper is an inkjet drawing method in which an image is recorded by ejecting ink droplets in response to an image signal and causing the ink droplets to impact on the recording medium. As an image forming apparatus which employs such an inkjet drawing system, there exists a full-line head image drawing apparatus, in which an ejection unit (nozzle) which ejects ink droplets, is disposed in a line facing the whole of one side of the recording medium, and the recording medium is conveyed in a direction orthogonal to the ejection unit so as to record an image over the whole area of recording medium.

By conveying the recording medium without moving the ejection unit, the full-line head image drawing apparatus is able to draw an image over the whole area of the recording medium and increase the recording speed.

However, with line-head image forming apparatuses, there is the problem that streaks or unevenness of the image recorded on the recording medium occurs due to inconsistencies during production such as displacement of the ejection unit. Such streaks and unevenness are caused by scatter of the ink droplet impact position, and techniques to correct streaks and unevenness, based on the impact position, are known.

Japanese Patent Application Publication No. 2008-44273 discloses a technology whereby a line pattern and, at the same time, a reference pattern are read with a scanner, and the impact position is measured while correcting any scanner conveyance errors.

Japanese Patent Application Publication No. 2008-80630 discloses a technology which reads a line pattern with a scanner to determine the edge position of a line from the read image, and measure the line position (impact position) from a plurality of edge positions for each line.

A large number of commercially available scanners repeatedly execute data transfer and reading, rather than not reading an entire reading range at a fixed speed. Here, a read operation may be suspended and the carriage halted, and the carriage may be operated once again. Although dot deposition position accuracy on the order of 10 μm is a reasonable expectation, when positional accuracy at the submicron level is required, any variation in position caused by the carriage restarting is a cause of errors that cannot be overlooked.

Furthermore, when the measurement target is long in the sub-scanning direction (varies depending on the device type, but roughly 10 cm or longer, only as a guide for example), errors are also caused by a change in position due to wobble of the carriage of the scanning mechanism. Such errors are significant in cases where a line pattern, obtained by arranging lines of deposition dots from adjacent nozzles in different positions in the sub-scanning direction, is measured, as illustrated in FIG. 28.

Line block 0 illustrated in FIG. 28 is a line group block formed by nozzles with nozzle numbers "4N+0" (where N is 0 or a higher integral number), such as the nozzle numbers 0, 4, and 8, when nozzles are assigned the numbers 0, 1, 2, 3, . . . starting at one end of the line head. Line block 1 is a line block of nozzle numbers "4N+1" such as nozzle numbers 1, 5, 9, . . . . Line block 2 is a line block of nozzle numbers "4N+2", and line block 3 is a line block of nozzle numbers "4N+3". Thus, lines corresponding to all the nozzles can be formed according to a line pattern in which line blocks, formed with lines using a fixed nozzle pitch, are disposed in different positions on a recording paper 16.

FIG. 29 illustrates the relationship between measurement positions when the scanner sub-scanning position varies. As illustrated in FIG. 29, the measurement positions of line blocks A and B, disposed in different positions in the sub-scanning direction, when line blocks A and B are each measured, are subject to a linear relationship. Scanner-induced errors, as described earlier, appear as disruption of the lattice co-ordinate system read with the scanner.

FIG. 30 illustrates the result of measuring the position (dot position) errors of each line from a line pattern, in which line blocks with a 16-nozzle pitch are disposed in different positions in the sub-scanning direction, instead of the 4-nozzle pitch line blocks illustrated in FIG. 28.

The position errors of the respective nozzle positions are probably random. However, as illustrated in FIG. 30, generally, regular position errors with a 16-nozzle cycle are generated. This includes offset position errors in each of the line blocks in different positions in the sub-scanning direction.

In other words, even though measurement accuracy may be achieved between the data in each of the plurality of line blocks divided in the sub-scanning direction, because a certain offset error is applied for measurement accuracy between the line blocks, a phenomenon arises whereby the measurement result is repeated with similarity, in a cycle containing a number of line blocks.

An error of around 2 to 3 μm for the scanner resolution (2400 DPI, for example) is not problematic in normal case illustrate ever, in cases where measurement on the submicron order is targeted, this deviation cannot be disregarded, and may be a problem when merging the measurement results of the plurality of line blocks.

Furthermore, in addition to scanner-induced errors, similar phenomena are also produced by paper deformation (as an example, for example, in a printing apparatus in which ink is deposited after applying a treatment liquid to recording paper, similar phenomena may occur due to a difference in the extension of the recording paper in the print start position and print end position). In dot deposition position measurement performed with in the presence of paper deformation, similar phenomena can occur due to the combination of both an offset error and a line pitch extension error.

A technology to counter this problem, which corrects the disruption of the image data read by the scanner, is not disclosed or suggested in Japanese Patent Application Publication Nos. 2008-44273 and 2008-80630.

SUMMARY OF THE INVENTION

The present invention has been conceived in view of the above situation, and an object of the present invention is to provide a dot position measurement method and a dot position measurement apparatus with which the positions of dots recorded on a recording medium using recording elements of the recording head can be measured rapidly and highly accurately, and a computer program used for the method and apparatus.

In order to attain an object described above, one aspect of the present invention is directed to a dot position measurement method comprising: a line pattern formation step of recording dots on a recording medium continuously by a plurality of recording elements of a recording head while performing relative movement between the recording head and the recording medium in such a manner that a measurement line pattern including a plurality of lines of rows of the dots corresponding to the plurality of recording elements respectively is formed on the recording medium, the measurement line pattern having a plurality of line blocks including recording line blocks and a reference line block, each of the recording line blocks including a group of the lines recorded by the recording elements spaced by a prescribed distance in a direction in which the plurality of recording elements are substantially arranged and which is perpendicular to a direction of the relative movement of the recording head, the reference line block including a group of the lines recorded by the recording elements selected from the recording elements for each of the recording line blocks; a reading step of reading the measurement line pattern on the recording medium formed in the line pattern formation step with an image reading apparatus in a state where a longitudinal direction of the plurality of lines of the measurement line pattern are directed to a sub-scanning direction of the image reading apparatus in such a manner that an electronic image data indicating a read image of the measurement line pattern is acquired; a line block position determination step of determining positions of the respective lines in each of the plurality of line blocks according to the read image acquired in the reading step; and a position correction step of correcting the positions of the respective lines in each of the recording line blocks determined in the line block position determination step, according to the reference line block.

In order to attain an object described above, another aspect of the present invention is directed to a dot position measurement apparatus comprising: an image reading device for reading a measurement line pattern formed by recording dots on a recording medium continuously by a plurality of recording elements of a recording head while performing relative movement between the recording head and the recording medium, the measurement line pattern including a plurality of lines of rows of the dots corresponding to the plurality of recording elements respectively and having a plurality of line blocks that include recording line blocks and a reference line block, each of the recording line blocks including a group of the lines recorded by the recording elements spaced by a prescribed distance in a direction in which the plurality of recording elements are substantially arranged and which is perpendicular to a direction of the relative movement of the recording head, the reference line block including a group of the lines recorded by the recording elements selected from the recording elements for each of the recording line blocks, in such a manner that the image reading device reads the measurement line pattern in a state where a longitudinal direction of the plurality of lines of the measurement line pattern are directed to a sub-scanning direction of the image reading apparatus so that an electronic image data indicating a read image of the measurement line pattern is acquired; and a line block position determination device which determines positions of the respective lines in each of the plurality of line blocks according to the read image acquired by the image reading device; and a position correction device which corrects the positions of the respective lines in each of the recording line blocks determined by the line block position determination device, according to the reference line block.

In order to attain an object described above, another aspect of the present invention is directed to a computer readable medium storing instructions causing a computer to function as the line block position determination device and the position correction device of the dot position measurement apparatus.

According to the present invention, by correcting the measurement positions of each line block with a reference line block serving as a reference point, the effect of disruption of the read image lattice caused by the image reading apparatus can be diminished, whereby the effect of paper deformation can be reduced, making highly accurate dot position measurement possible.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein.

DETAILED DESCRIPTION OF THE PREFERRED EMBODIMENTS

An embodiment of the present invention is described below, with reference to figures.

Here, an example of the application to the measurement of the dot deposition positions (that is, dot positions) by an inkjet recording apparatus is described. Firstly, the overall composition of an inkjet recording apparatus will be described.

Description of Inkjet Recording Apparatus

Figure 1:
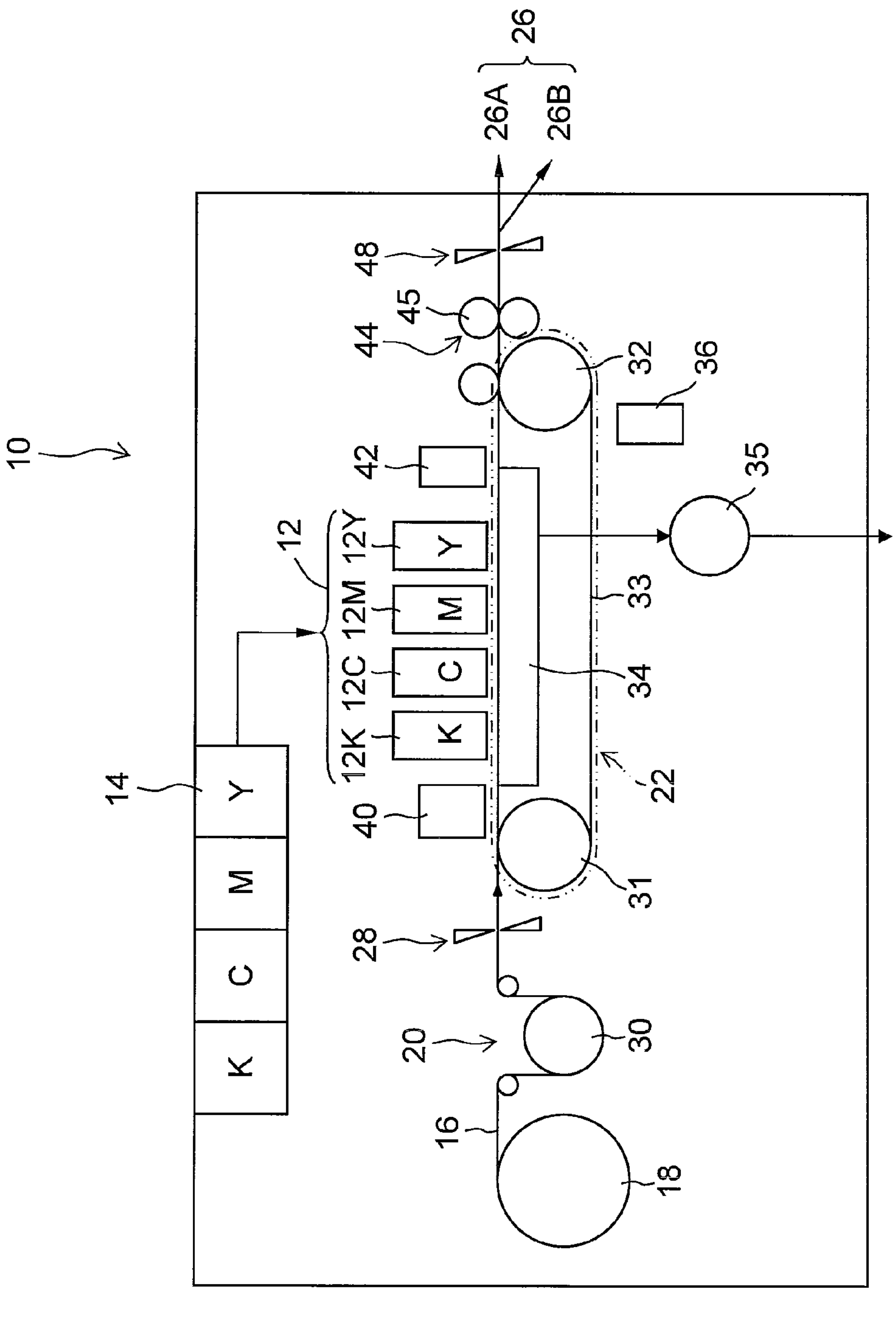
FIG. 1 is a general schematic drawing of an inkjet recording apparatus.

FIG. 1 is a general schematic drawing of an inkjet recording apparatus. As illustrated in FIG. 1, the inkjet recording apparatus 10 comprises: a print unit 12 having a plurality of inkjet recording heads (corresponding to "liquid ejection heads", hereinafter, called "heads") 12K, 12C, 12M and 12Y provided for ink colors of black (K), cyan (C), magenta (M), and yellow (Y), respectively; an ink storing and loading unit 14 for storing inks to be supplied to the heads 12K, 12C, 12M and 12Y; a paper supply unit 18 for supplying recording paper 16 forming a recording medium; a decurling unit 20 for removing curl in the recording paper 16; a belt conveyance unit 22, disposed facing the nozzle face (ink ejection face) of the print unit 12, for conveying the recording paper 16 while keeping the recording paper 16 flat; and a paper output unit 26 for outputting recorded recording paper (printed matter) to the exterior.

The ink storing and loading unit 14 has ink tanks for storing the inks of each color to be supplied to the heads 12K, 12C, 12M, and 12Y respectively, and the tanks are connected to the heads 12K, 12C, 12M, and 12Y by means of prescribed channels. The ink storing and loading unit 14 has a warning device (for example, a display device or an alarm sound generator) for warning when the remaining amount of any ink is low, and has a mechanism for preventing loading errors among the colors.

In FIG. 1, a magazine for rolled paper (continuous paper) is illustrated as an example of the paper supply unit 18; however, a plurality of magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium (media) can be used, it is desirable that a medium such as a bar code and a wireless tag containing information about the type of medium is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is desirably controlled so that the recording paper 16 has a curl in which the surface on which the print is to be made is slightly round outward.

In the case of the configuration in which roll paper is used, a cutter (first cutter) 28 is provided as illustrated in FIG. 1, and the continuous paper is cut into a desired size by the cutter 28.

The decurled and cut recording paper 16 is delivered to the belt conveyance unit 22. The belt conveyance unit 22 has a configuration in which an endless belt 33 is set around rollers 31 and 32 so that the portion of the endless belt 33 facing at least the nozzle face of the print unit 12 forms a horizontal plane (flat plane).

The belt 33 has a width that is greater than the width of the recording paper 16, and a plurality of suction apertures (not illustrated) are formed on the belt surface. A suction chamber 34 is disposed in a position facing the nozzle surface of the print unit 12 on the interior side of the belt 33, which is set around the rollers 31 and 32, as illustrated in FIG. 1. The suction chamber 34 provides suction with a fan 35 to generate a negative pressure, and the recording paper 16 is held on the belt 33 by suction. It is also possible to use an electrostatic attraction method, instead of a suction-based attraction method.

The belt 33 is driven in the clockwise direction in FIG. 1 by the motive force of a motor 88 (illustrated in FIG. 6) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not illustrated, examples thereof include a configuration of nipping with a brush roller and a water absorbent roller or the like, an air blow configuration of blowing clean air, or a combination of these.

Instead of the belt conveyance unit 22, it is also possible to adopt a mode which uses a roller nip conveyance mechanism, but when the print region is conveyed by a roller nip mechanism, the printed surface of the paper makes contact with the roller directly after printing, and hence there is a possibility that the image is liable to be blurred. Therefore, a suction belt conveyance mechanism which does not make contact with the image surface in the print region is desirable, as in the present example.

A heating fan 40 is disposed on the upstream side of the print unit 12 in the conveyance pathway formed by the belt conveyance unit 22. The heating fan 40 blows heated air onto the recording paper 16 to heat the recording paper 16 immediately before printing so that the ink deposited on the recording paper 16 dries more easily.

Figure 2A:
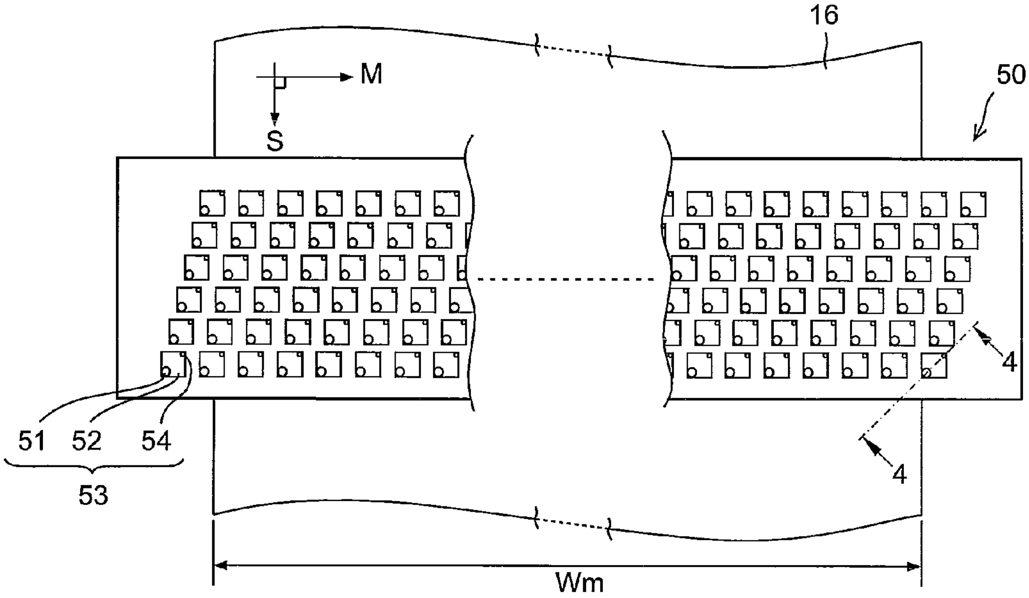
FIGS. 2A and 2B are plan view perspective diagrams illustrating an example of the composition of a print head.
Figure 2B:
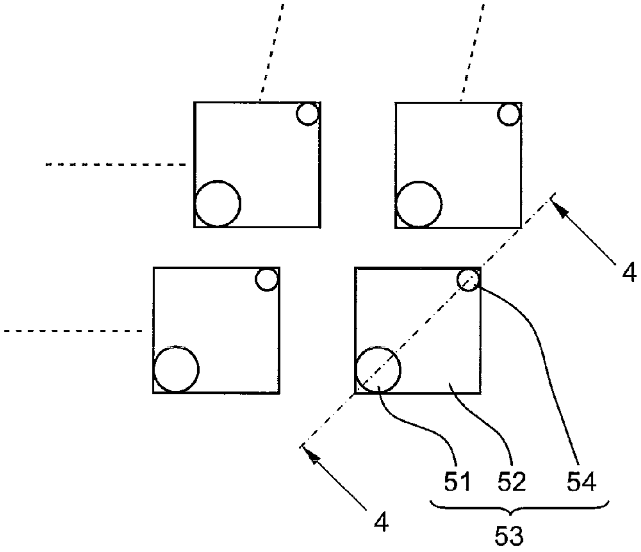

The heads 12K, 12C, 12M and 12Y of the print unit 12 are full line heads having a length corresponding to the maximum width of the recording paper 16 used with the inkjet recording apparatus 10, and comprising a plurality of nozzles for ejecting ink arranged on a nozzle face through a length exceeding at least one edge of the maximum-size recording medium (namely, the full width of the printable range) (see FIGS. 2A and 2B).

The print heads 12K, 12C, 12M and 12Y are arranged in color order (black (K), cyan (C), magenta (M), yellow (Y)) from the upstream side in the feed direction of the recording paper 16, and these respective heads 12K, 12C, 12M and 12Y are fixed extending in a direction substantially perpendicular to the conveyance direction of the recording paper 16.

A color image can be formed on the recording paper 16 by ejecting inks of different colors from the heads 12K, 12C, 12M and 12Y, respectively, onto the recording paper 16 while the recording paper 16 is conveyed by the belt conveyance unit 22.

By adopting a configuration in which the full line heads 12K, 12C, 12M and 12Y having nozzle rows covering the full paper width are provided for the respective colors in this way, it is possible to record an image on the full surface of the recording paper 16 by performing just one operation of relatively moving the recording paper 16 and the print unit 12 in the paper conveyance direction (the sub-scanning direction), in other words, by means of a single sub-scanning action. It is possible for the image formation based on a single-pass system with such a full-line type (page-wide type) head to perform high speed printing, compared to the image formation based on a multi-pass system with a serial (shuttle) head reciprocating in a direction (main scanning direction) perpendicular to the conveyance direction (sub-scanning direction) of a recording medium, thereby improving printing productivity.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

A post-drying unit 42 is disposed following the print unit 12. The post-drying unit 42 is a device to dry the printed image surface, and includes a heating fan, for example. It is desirable to avoid contact with the printed surface until the printed ink dries, and a device that blows heated air onto the printed surface is desirable.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are desirably outputted separately. In the inkjet recording apparatus 10, a sorting device (not illustrated) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. Although not illustrated in FIG. 1, the paper output unit 26A for the target prints is provided with a sorter for collecting prints according to print orders.

Structure of the Head

Next, the structure of a head will be described. The heads 12K, 12C, 12M and 12Y of the respective ink colors have the same structure, and a reference numeral 50 is hereinafter designated to any of the heads.

Figure 3:
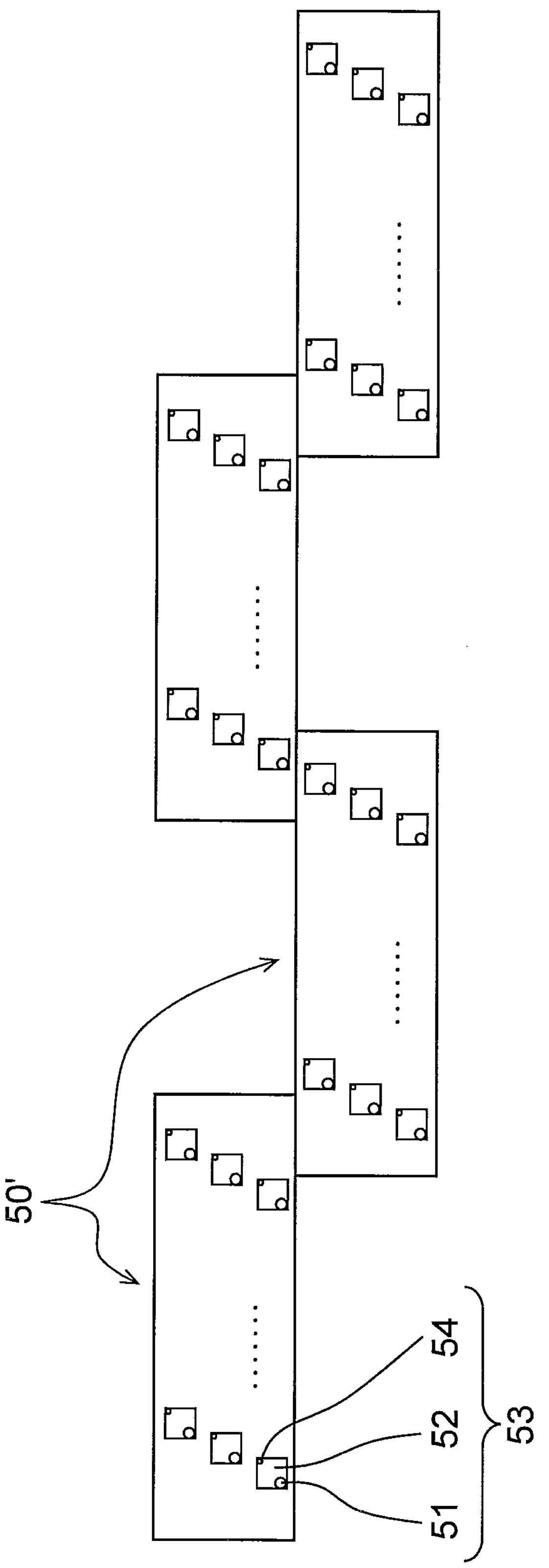
FIG. 3 is a plan view perspective diagram illustrating a further example of the composition of a full line head.
Figure 4:
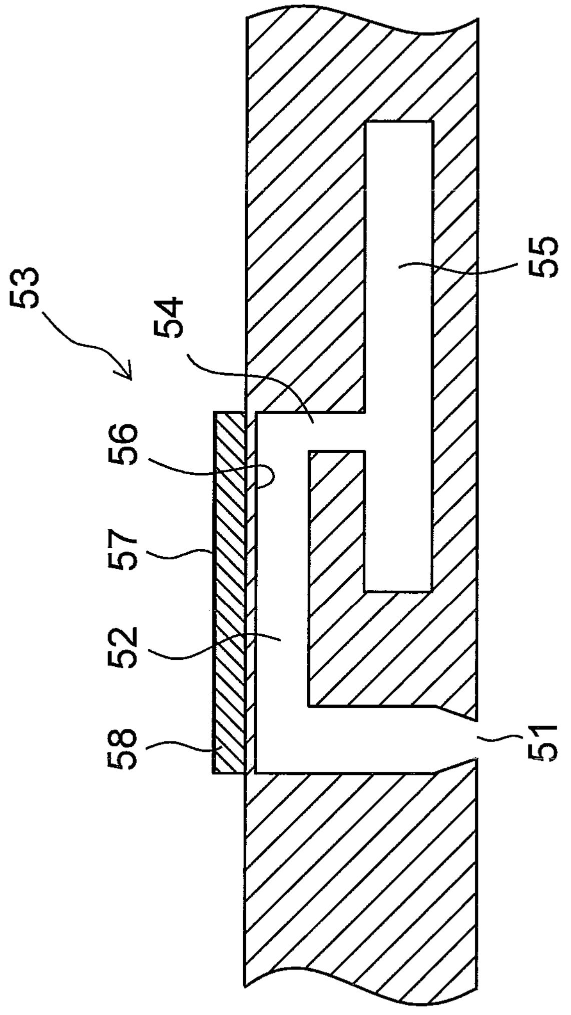
FIG. 4 is a cross-sectional view along line 4-4 in FIGS. 2A and 2B.

FIG. 2A is a plan view perspective diagram illustrating an example of the structure of a head 50, and FIG. 2B is an enlarged diagram of a portion of same. Furthermore, FIG. 3 is a plan view perspective diagram (a cross-sectional view along the line 4-4 in FIGS. 2A and 2B) illustrating another example of the structure of the head 50, and FIG. 4 is a cross-sectional diagram illustrating the composition of a liquid droplet ejection element corresponding to one which forms a unit recording element (namely, an ink chamber unit corresponding to one nozzle 51).

The nozzle pitch in the head 50 should be minimized in order to maximize the density of the dots printed on the surface of the recording paper 16. As illustrated in FIGS. 2A and 2B, the head 50 according to the present embodiment has a structure in which a plurality of ink chamber units (droplet ejection elements) 53, each comprising a nozzle 51 forming an ink ejection port, a pressure chamber 52 corresponding to the nozzle 51, and the like, are disposed two-dimensionally in the form of a staggered matrix, and hence the effective nozzle interval (the projected nozzle pitch) as projected (orthogonal projection) in the lengthwise direction of the head (the direction perpendicular to the paper conveyance direction) is reduced and high nozzle density is achieved.

The mode of forming nozzle rows with a length not less than a length corresponding to the entire width Wm of the recording paper 16 in a direction (the direction of arrow M; main-scanning direction) substantially perpendicular to the conveyance direction (the direction of arrow S; sub-scanning direction) of the recording paper 16 is not limited to the example described above. For example, instead of the configuration in FIG. 2A, as illustrated in FIG. 3, a line head having nozzle rows of a length corresponding to the entire width of the recording paper 16 can be formed by arranging and combining, in a staggered matrix, short head modules 50' having a plurality of nozzles 51 arrayed in a two-dimensional fashion.

As illustrated in FIGS. 2A and 2B, the planar shape of the pressure chamber 51 provided corresponding to each nozzle 52 is substantially a square shape, and an outlet port to the nozzle 51 is provided at one of the ends of a diagonal line of the planar shape, while an inlet port (supply port) 54 for supplying ink is provided at the other end thereof. The shape of the pressure chamber 52 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

As illustrated in FIG. 4, each pressure chamber 52 is connected to a common channel 55 through the supply port 54. The common channel 55 is connected to an ink tank (not illustrated in Figures), which is a base tank that supplies ink, and the ink supplied from the ink tank is delivered through the common flow channel 55 to the pressure chambers 52.

An actuator 58 provided with an individual electrode 57 is bonded to a pressure plate (a diaphragm that also serves as a common electrode) 56 which forms the surface of one portion (in FIG. 4, the ceiling) of the pressure chambers 52. When a drive voltage is applied to the individual electrode 57 and the common electrode, the actuator 58 deforms, thereby changing the volume of the pressure chamber 52. This causes a pressure change which results in ink being ejected from the nozzle 51. For the actuator 58, it is possible to adopt a piezoelectric element using a piezoelectric body, such as lead zirconate titanate, barium titanate, or the like. When the displacement of the actuator 58 returns to its original position after ejecting ink, the pressure chamber 52 is replenished with new ink from the common channel 55 via the supply port 54.

By controlling the driving of the actuators 58 corresponding to the nozzles 51 in accordance with the dot arrangement data generated from the input image, it is possible to eject ink droplets from the nozzles 51. By controlling the ink ejection timing of the nozzles 51 in accordance with the speed of conveyance of the recording paper 16, while conveying the recording paper in the sub-scanning direction at a uniform speed, it is possible to record a desired image on the recording paper 16.

Figure 5:
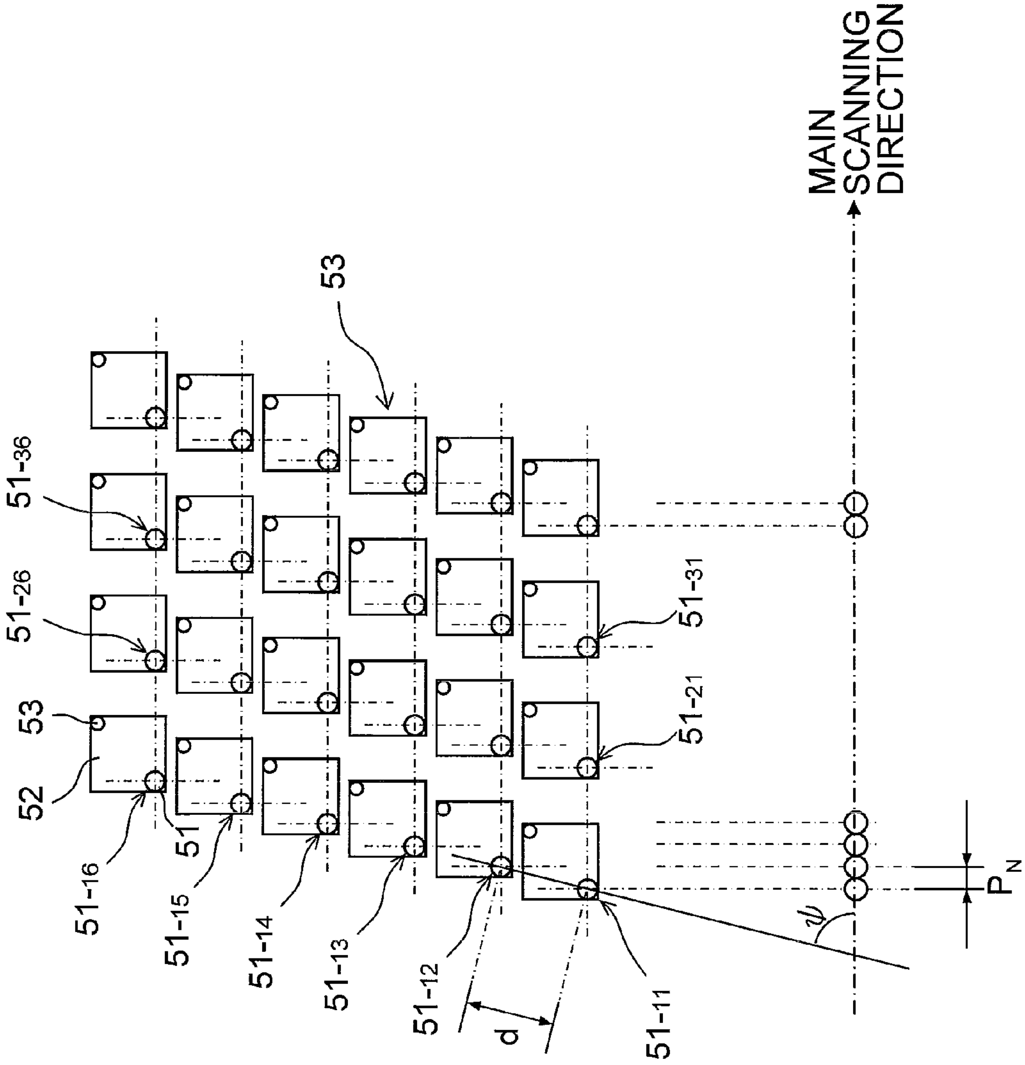
FIG. 5 is an enlarged diagram illustrating an example of the arrangement of nozzles in a head.

As illustrated in FIG. 5, the high-density nozzle head according to the present embodiment is achieved by arranging obliquely a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of ψ with respect to the main scanning direction, the pitch PN of the nozzles projected so as to align in the main scanning direction is d×cos ψ, and hence the nozzles 51 can be regarded to be substantially equivalent to those arranged linearly at a fixed pitch PN along the main scanning direction.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in, for example, following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 51 arranged in a matrix such as that illustrated in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block; . . . ); and one line is printed in the width direction of the recording paper 16 by sequentially driving the nozzles 51-11, 51-12, . . . , 51-16 in accordance with the conveyance velocity of the recording paper 16.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 16 is called the sub-scanning direction and the direction perpendicular to same is called the main scanning direction.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 6:
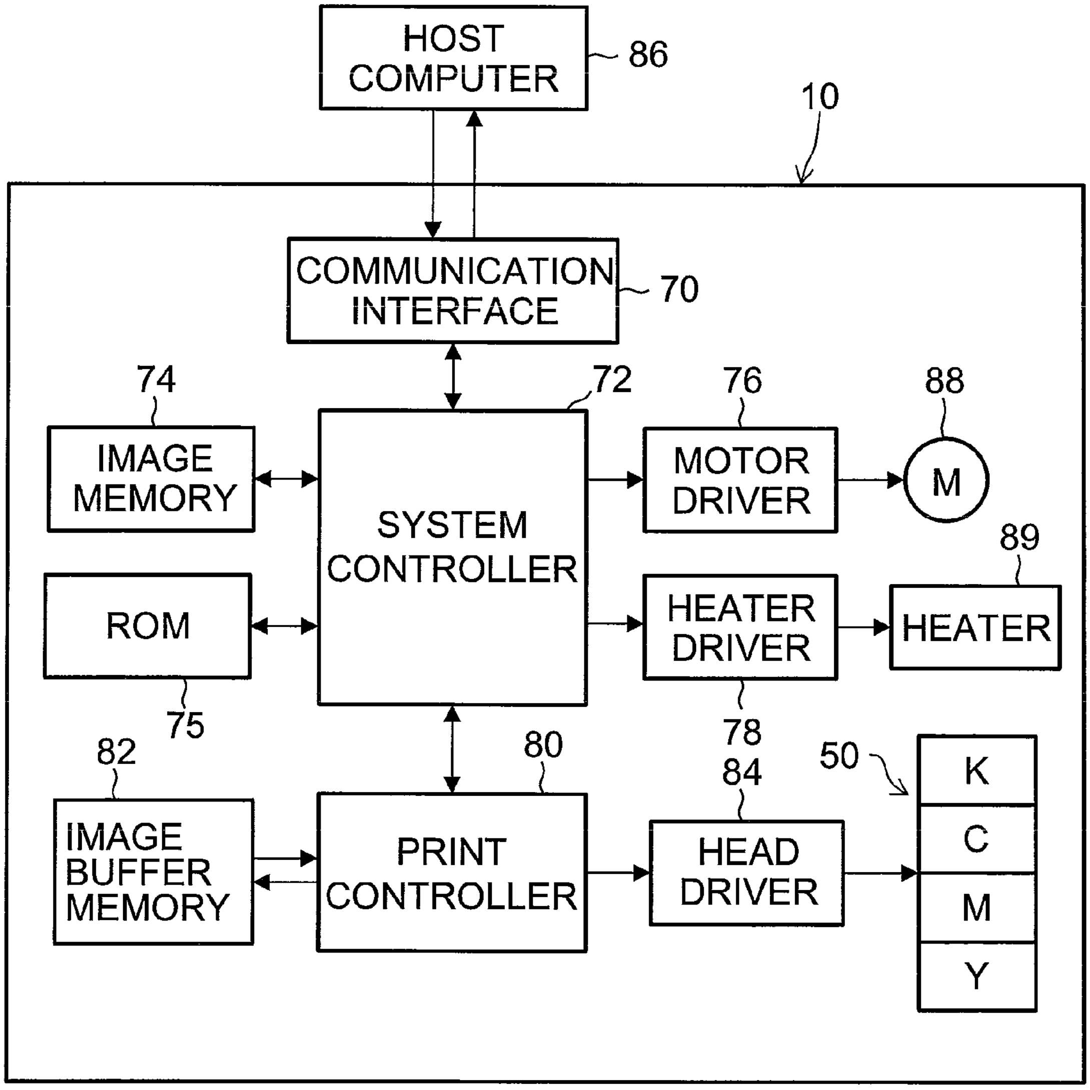
FIG. 6 is a block diagram illustrating a system composition of the inkjet recording apparatus.

FIG. 6 is a block diagram illustrating the system configuration of the inkjet recording apparatus 10. As illustrated in FIG. 6, the inkjet recording apparatus 10 comprises a communication interface 70, a system controller 72, an image memory 74, a ROM 75, a motor driver 76, a heater driver 78, a print controller 80, an image buffer memory 82, a head driver 84, and the like.

The communication interface 70 is an interface unit (image input unit) for receiving image data sent from a host computer 86. A serial interface such as USB (Universal Serial Bus), IEEE1394, Ethernet (registered trademark), wireless network, or a parallel interface such as a Centronics interface may be used as the communication interface 70. A buffer memory (not illustrated) may be mounted in this portion in order to increase the communication speed.

The image data sent from the host computer 86 is received by the inkjet recording apparatus 10 through the communication interface 70, and is stored temporarily in the image memory 74. The image memory 74 is a storage device for storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, as well as controlling communications with the host computer 86 and writing and reading to and from the image memory 74 and ROM 75, and it also generates control signals for controlling the motor 88 and heater 89 of the conveyance system.

Programs executed by the CPU of the system controller 72 and the various types of data which are required for control procedures are stored in the ROM 75. The ROM 75 may be a non-writeable storage device, or it may be a rewriteable storage device, such as an EEPROM. The image memory 74 is used as a temporary storage region for the image data, and it is also used as a program development region and a calculation work region for the CPU.

The motor driver (drive circuit) 76 drives the motor 88 of the conveyance system in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data (original image data) stored in the image memory 74 in accordance with commands from the system controller 72 so as to supply the generated print data (dot data) to the head driver 84.

The print controller 80 is provided with the image buffer memory 82; and image data, parameters, and other data are temporarily stored in the image buffer memory 82 when image data is processed in the print controller 80. The aspect illustrated in FIG. 6 is one in which the image buffer memory 82 accompanies the print controller 80; however, the image memory 74 may also serve as the image buffer memory 82. Also possible is an aspect in which the print controller 80 and the system controller 72 are integrated to form a single processor.

To give a general description of the sequence of processing from image input to print output, image data to be printed (original image data) is input from an external source via a communications interface 70, and is accumulated in the image memory 74. At this stage, RGB image data is stored in the image memory 74, for example.

In this inkjet recording apparatus 10, an image which appears to have a continuous tonal graduation to the human eye is formed by changing the droplet ejection density and the dot size of fine dots created by ink (coloring material), and therefore, it is necessary to convert the input digital image into a dot pattern which reproduces the tonal gradations of the image (namely, the light and shade toning of the image) as faithfully as possible. Therefore, original image data (RGB data) stored in the image memory 74 is sent to the print controller 80 through the system controller 72, and is converted to the dot data for each ink color by a half-toning technique, using a threshold value matrix, error diffusion, or the like, in the print controller 80.

In other words, the print controller 80 performs processing for converting the input RGB image data into dot data for the four colors of K, C, M and Y. The dot data generated by the print controller 180 in this way is stored in the image buffer memory 82.

The head driver 84 outputs a drive signal for driving the actuators 58 corresponding to the nozzles 51 of the head 50, on the basis of print data (in other words, dot data stored in the image buffer memory 182) supplied by the print controller 80. A feedback control system for maintaining constant drive conditions in the head may be included in the head driver 84.

By supplying the drive signal output by the head driver 84 to the head 50, ink is ejected from the corresponding nozzles 51. By controlling ink ejection from the print heads 50 in synchronization with the conveyance speed of the recording paper 16, an image is formed on the recording paper 16.

As described above, the ejection volume and the ejection timing of the ink droplets from the respective nozzles are controlled via the head driver 84, on the basis of the dot data generated by implementing prescribed signal processing in the print controller 80, and the drive signal waveform. By this means, desired dot sizes and dot positions can be achieved.

Furthermore, the print controller 80 carries out various corrections with respect to the head 50, on the basis of information on the dot positions acquired by the dot position measurement method described below, and furthermore, it implements control for carrying out cleaning operations (nozzle restoration operations), such as preliminary ejection or nozzle suctioning, or wiping, according to requirements.

Explanation of Dot Position Measurement Method

The dot position measurement method according to the present embodiment will be described in detail hereinafter.

Figure 7:
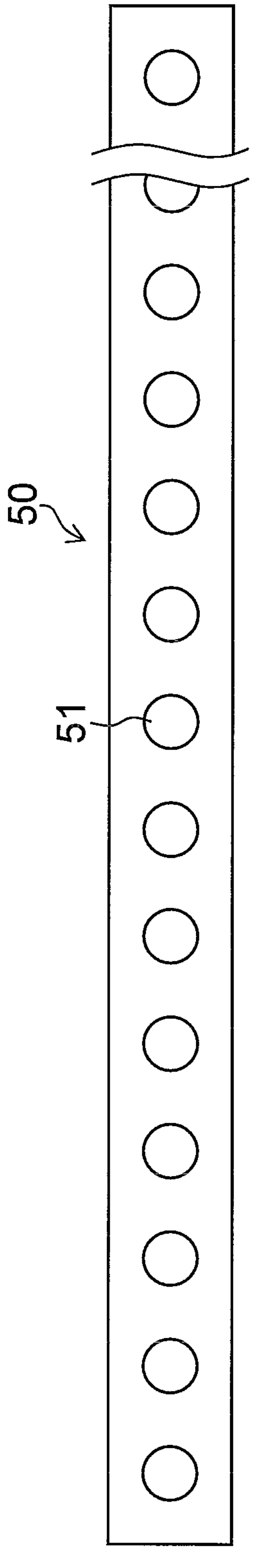
FIG. 7 is a schematic drawing illustrating a full line type of head.
Figure 8A:
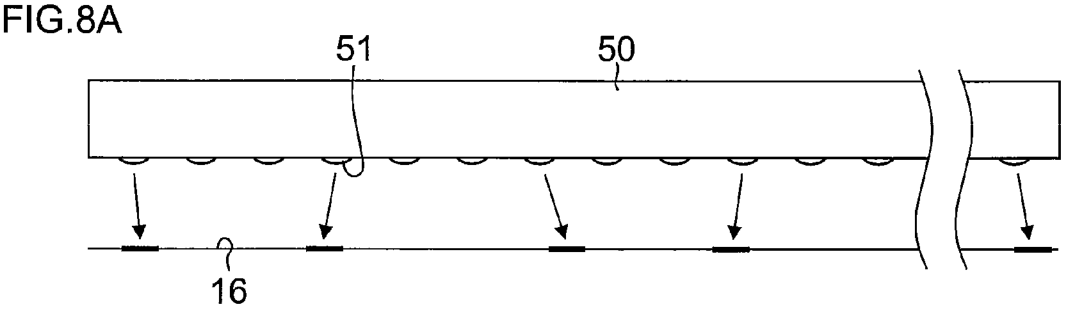
FIGS. 8A to 8C are explanatory diagrams of ejection characteristics of a print head, and lines recorded by the print head.
Figure 8B:
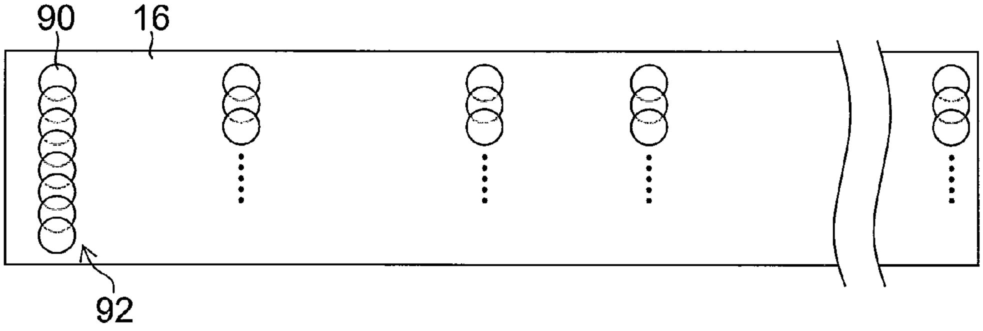
Figure 8C:
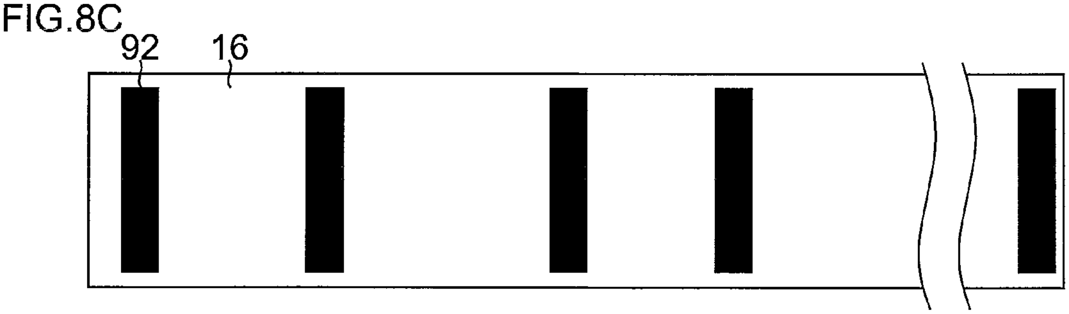

FIG. 7 is a schematic drawing illustrating a full line head. In order to simplify the illustration, FIG. 7 illustrates a head 50 with a plurality of nozzles 51 in a row. However, as illustrated in FIGS. 2A to 5, a matrix head with a plurality of nozzles arranged in two dimensions is of course also applicable. That is, in light of a substantial nozzle row obtained by orthogonally projecting a nozzle group in a two-dimensional array on a straight line in the main scanning direction, such a nozzle group in a two-dimensional array can be treated so as to be substantially equivalent to one nozzle row FIG. 8A illustrates an aspect in which the impact position varies with respect to an ideal position, due to inconsistency in the ejection direction of ink droplets ejected by the nozzles in a line head. FIG. 8B is an example for when a print head 50 with the characteristics illustrated in FIG. 8A is used to draw a line on recording paper 16, in the sub-scanning direction. When the recording paper 16 is conveyed while droplets are ejected toward the recording paper 16 from the nozzles 51 of the head 50, the ink droplets impact on the recording paper 16, and, as illustrated in FIG. 8B, a dot row (line 92) in which a row of dots 90 caused by the impacting ink from the nozzles 51 stand in a line, is formed. FIG. 8C illustrates line 92 in FIG. 8B in simplified form. Hereinafter, the line 92 formed by a row of impact dots caused by continuously ejected droplets, will be described using FIG. 8C to facilitate the illustration.

As illustrated in FIGS. 8B and 8C, each of the lines 92 is formed by continuous droplets from a single nozzle 51. When a line head of high recording density is used, because there is a partial overlap between the dots of adjacent nozzles when ejection is performed simultaneously from all the nozzles, a line comprising a single dot row is not formed. In order to prevent a mutual overlap between the lines 92, there is desirably at least one nozzle, and desirably three or more nozzles between the simultaneously ejecting nozzles at a distance therefrom. Note that FIGS. 8A to 8C illustrate an aspect in which there is a two-nozzle interval between the simultaneously ejecting nozzles for illustrative purposes.

As can be seen from FIGS. 8A to 8C, the line position changes according to the dot impact position, based on the characteristics of the print head. In other words, it is clear that measuring the impact position of each nozzle is the same thing as measuring the positions of the lines.

Example of a Dot Position Measurement Line Pattern

Figure 9:
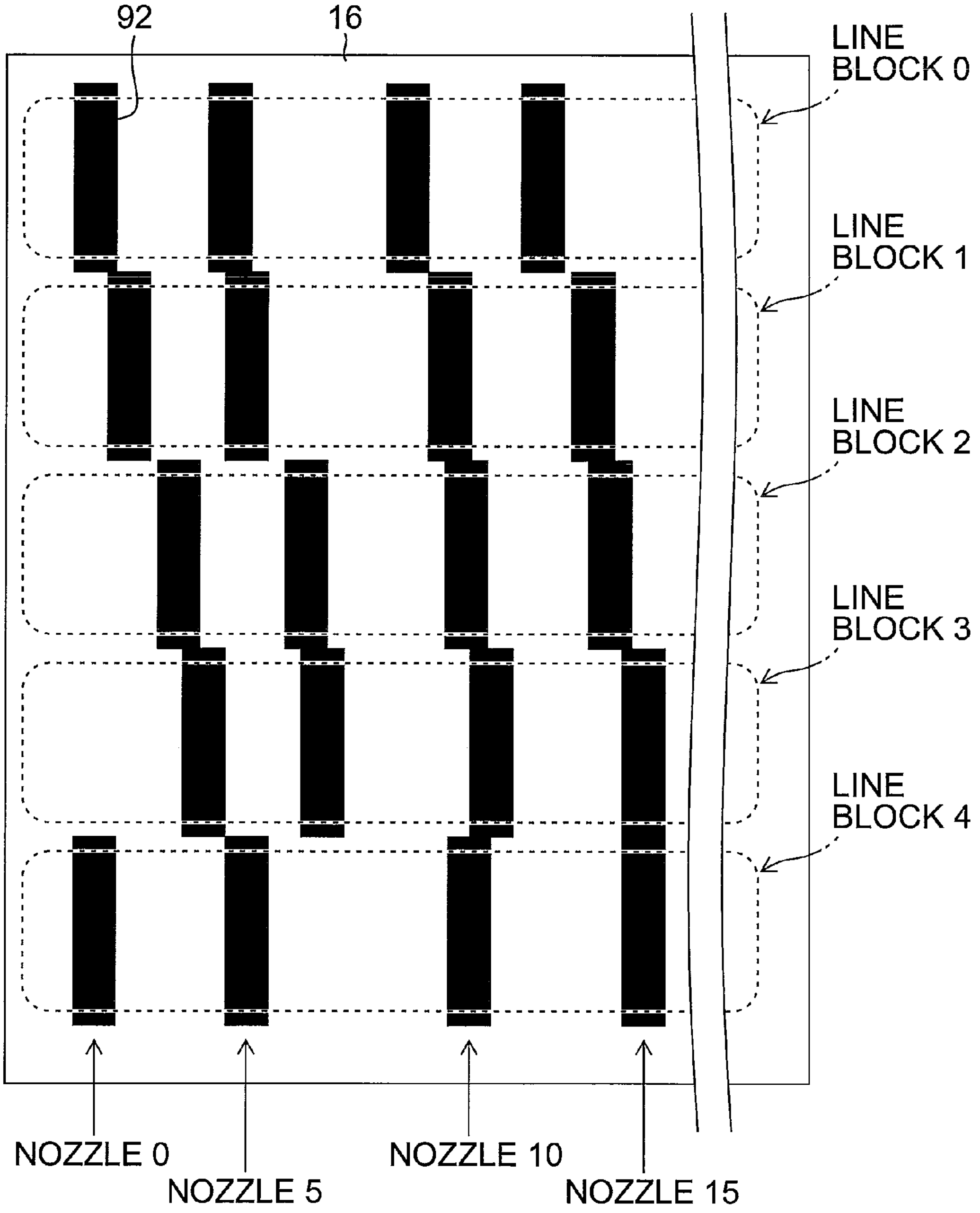
FIG. 9 illustrates an example of a dot position measurement line pattern.

FIG. 9 provides an overall view of a dot position measurement line pattern that is used in an embodiment of the present invention. In order to obtain lines for all the nozzles 51 in the head 50, for example, a sample chart (measurement chart) for the line pattern as indicated in FIG. 9, is formed.

The illustrated chart includes a plurality of line blocks (here, line blocks 0 to 4 in five stages are illustrated). The line blocks are blocks having a plurality of lines (line group) for which lines are drawn using nozzles at fixed intervals.

The nozzles of the line head in FIGS. 8A to 8C have nozzle numbers 0, 1, 2, 3, . . . respectively in order starting from the left side. A line block 0 illustrated in FIG. 9 is a line block including nozzle numbers "4N+0" (where N is an integer of 0 or more), such as the nozzle numbers 0, 4, and 8 (a line group block formed by nozzles with nozzle numbers corresponding to a multiple of four). Line block 1 is a line block of nozzle numbers "4N+1" such as the nozzle numbers 1, 5, 9, . . . . Line block 2 is a line block of nozzle numbers "4N+2", and line block 3 is a line block of nozzle numbers "4N+3". Line block 4 is a reference line block of nozzle numbers that are the same as the nozzle numbers selected substantially evenly from the line blocks 0 to 3.

Line block 4 of the present embodiment comprises nozzle numbers "5N+0" (nozzle numbers 0, 5, 10, 15, 20, . . . ). In line blocks 0 and 4, nozzle numbers 0, 20, 40, 60, . . . are the same nozzle numbers. In line blocks 1 and 4, nozzle numbers 5, 25, 45, 65, . . . are the same nozzle numbers. In line blocks 2 and 4, the nozzle numbers 10, 30, 50, 70, . . . are the same nozzle numbers. In line blocks 3 and 4, nozzle numbers 15, 35, 55, 75, . . . are the same nozzle numbers. Lines deposited from the same nozzle are thus formed in separate positions. The rotation angle when reading the line pattern is corrected by using the line position of the nozzle number common to line blocks 0 and 4.

A correction function for correcting the measurement position of line block 0 is determined using the line measurement positions (nozzle numbers 0, 20, 40, 60, 80, . . . ) of the same nozzle numbers as line block 0 and line block 4 (reference line block), and the measurement position of line block 0 is transformed using the determined correction function for correcting the measurement position of line block 0. A correction function for correcting the measurement position of line block 1 is determined using the line measurement positions (nozzle numbers 5, 25, 45, 65, . . . ) of the same nozzle numbers in line block 1 and line block 4 (reference line block), and the measurement position of line block 1 is transformed using the determined correction function for correcting the measurement position of line block 1. The same correction (transformation) is performed for line blocks 2 and 3 (the description is omitted here).

In the present embodiment, an example with nozzle numbers 4N+M (M=0, 1, 2, 3) is described, but the multiple is not limited to four. In AN+B (B=0, 1, . . . , A−1), A can be an integral number of two or more.

The reference line block corresponding to line block 4 is in the format CN+D (C≠A, where C and A do not have common divisors other than 1, and D=0, 1, or C−1), where the value of A×C is subject to a common nozzle number cycle.

In the example in FIG. 9, lines corresponding to all the nozzles of one head are formed from line blocks 0 to 3.

In other words, in the line head, when nozzle numbers are assigned in order starting from the end, in the main scanning direction, to the nozzles constituting a nozzle row (a substantial nozzle row obtained through orthogonal projection) that stands in one row substantially in the main scanning direction, the ejection timing for each of the groups (blocks) of nozzle numbers, 4N+0, 4N+1, 4N+2, and 4N+3, for example, is changed, thereby forming line groups (so-called "1 ON n OFF" type line patterns).

Consequently, as illustrated in FIG. 9, adjacent lines do not overlap within the same block and independent lines can be formed for all the nozzles (so-called "1 ON n OFF" type line pattern). A line block group illustrated as illustrated in FIG. 9 is formed for the heads corresponding to the respective ink colors CMYK.

Problems Relating to the Reading of Measurement Line Patterns

In recent years, as paper widths have grown larger and higher line-head densities have been developed, the number of nozzles to be measured has reached the tens of thousands or more. For example, a recording width of eleven (11) inches and a resolution of 1200 DPI requires 13200 nozzles for each ink, and for the four (4) inks of the CMYK color model, there are a total of 52800 nozzles. A print head with such a large number of nozzles requires a high-speed, high-accuracy, and low-cost deposition position measurement method.

More specifically, taking a 1200-DPI image drawing apparatus as an example, the recording lattice pitch for 1200 DPI is 21.17 μm, and a dot diameter equal to or more than 21.17×√2 is required to deposit dots gaplessly, which therefore requires a dot diameter of approximately 30 to 40 μm.

4800 DPI is about the upper limit for commercial scanners, even for high-resolution-type scanners, and, at this resolution, the reading lattice pitch of the scanner is approximately 5.29 μm. In comparison with the dot diameter, the deposition position must be found from as many as 6 to 8 pixels. This number is cut in half for 2400 DPI. Although higher resolutions are desirable for reading devices (scanners) in order to improve deposition position accuracy, higher reading device resolutions cause (i) problems with the size of read image data, and (ii) the problem that reading is not completed in a single pass.

For example, assuming that, for a reading resolution of 4800 DPI, the size of the deposition position precision measurement sample is A3-size, and the A3 reading range is then 11.5 inches×15.5 inches for a color image for the 8 bits on each of the three RGB channels, the total data amount of the read image is 12.3 GB. The total data amount of the read image is 3.08 GB even for the reading resolution of 2400 DPI. Such a large volume of data is time-consuming even when the data is only written to a hard disk device (HDD).

Moreover, since current commercial scanners have a limited reading range at the highest resolution (4800 DPI for an A4 scanner and 2400DPI for an A3 scanner, for example), the maximum reading range cannot be read all at once. Therefore, in order to be read, the maximum reading range must be divided into strips.

Thus, in cases where a single image is divided up for reading, each scanner initialization operation (the time taken to correct the brightness, and the time to move to the designated read position) takes time. Typically, an overlap region must be added to the reading range in order to ensure mutual conformity between the data corresponding to the reading regions thus divided. The image data requires extra capacity equivalent to this overlap region, and the reading time is extended by a margin corresponding to the overlap region. Typically, the larger the number of divisions of the whole reading range, the greater the proportion of the overlap region to the reading range. Even if processing is performed to reduce the image data and measures to reduce the write time are taken, dividing up an image causes problems, namely a larger image data capacity, and an increase in the reading time.

The technology disclosed in Japanese Patent Application Publication Nos. 2008-44273 and 2008-80630 is faced with the problem that, when this technology is used, an image cannot be read all at once or the processing time is long due to the large size of the image to be processed because the main and sub-scanning resolutions during reading are the same.

In view of this problem, the present embodiment provides, by means of the following devices, high-speed and high-accuracy reading, and a reduction in data capacity of a read image.

Reading of Measurement Line Pattern

Figure 10:
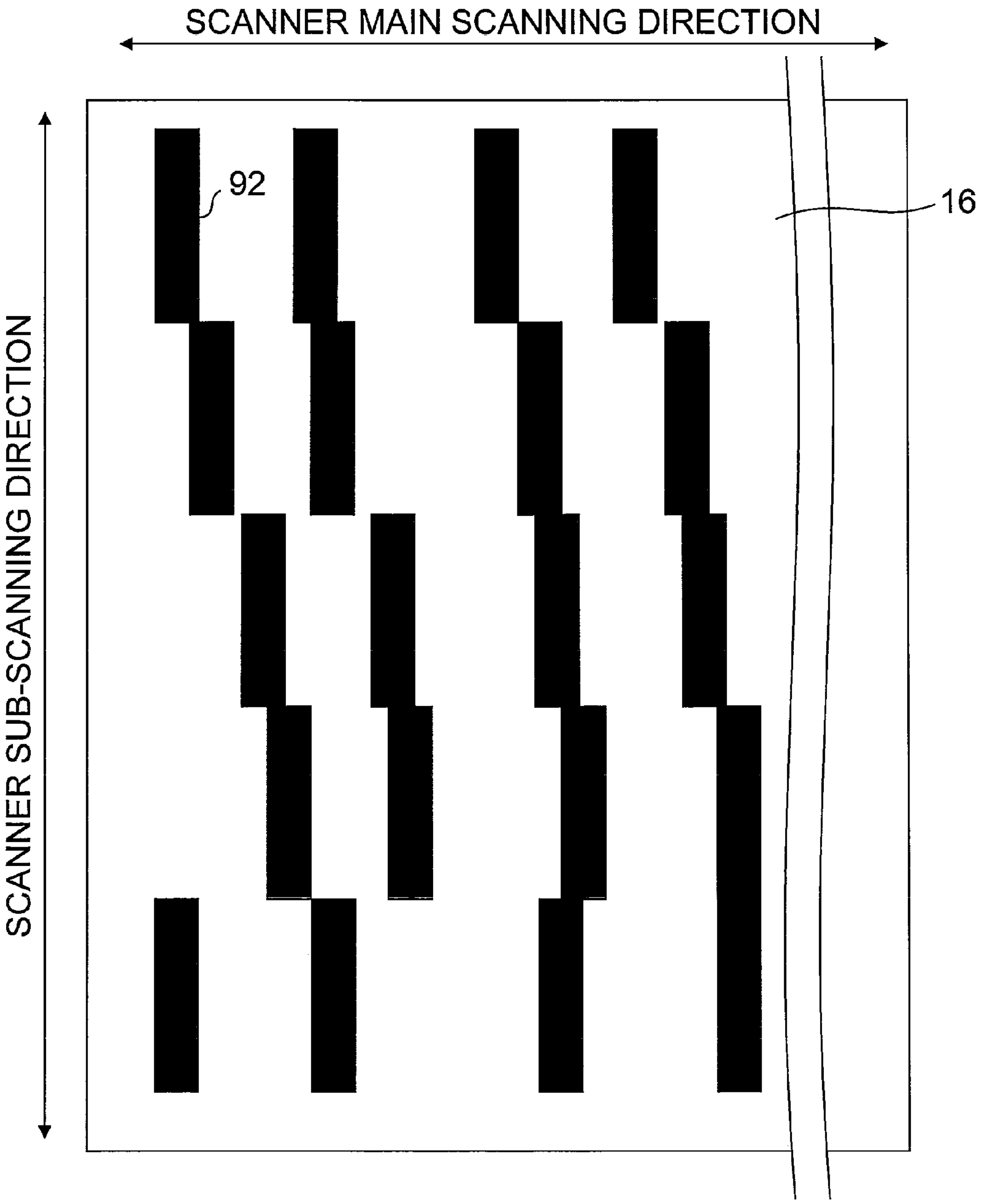
FIG. 10 is an explanatory diagram illustrating the relationship between a dot position measurement line pattern, and a main scanning direction and a sub-scanning direction of a scanner.

FIG. 10 illustrates a relationship in the scanner main scanning direction and sub-scanning direction when the dot position measurement line pattern is read with the scanner. As illustrated in FIG. 10, the direction in which lines 92 are arranged within the line block is matched to the scanner main scanning direction, and the longitudinal direction (lengthways direction) of the lines 92 is matched to the scanner sub-scanning direction, in order to read the dot position measurement line pattern.

Figure 11:
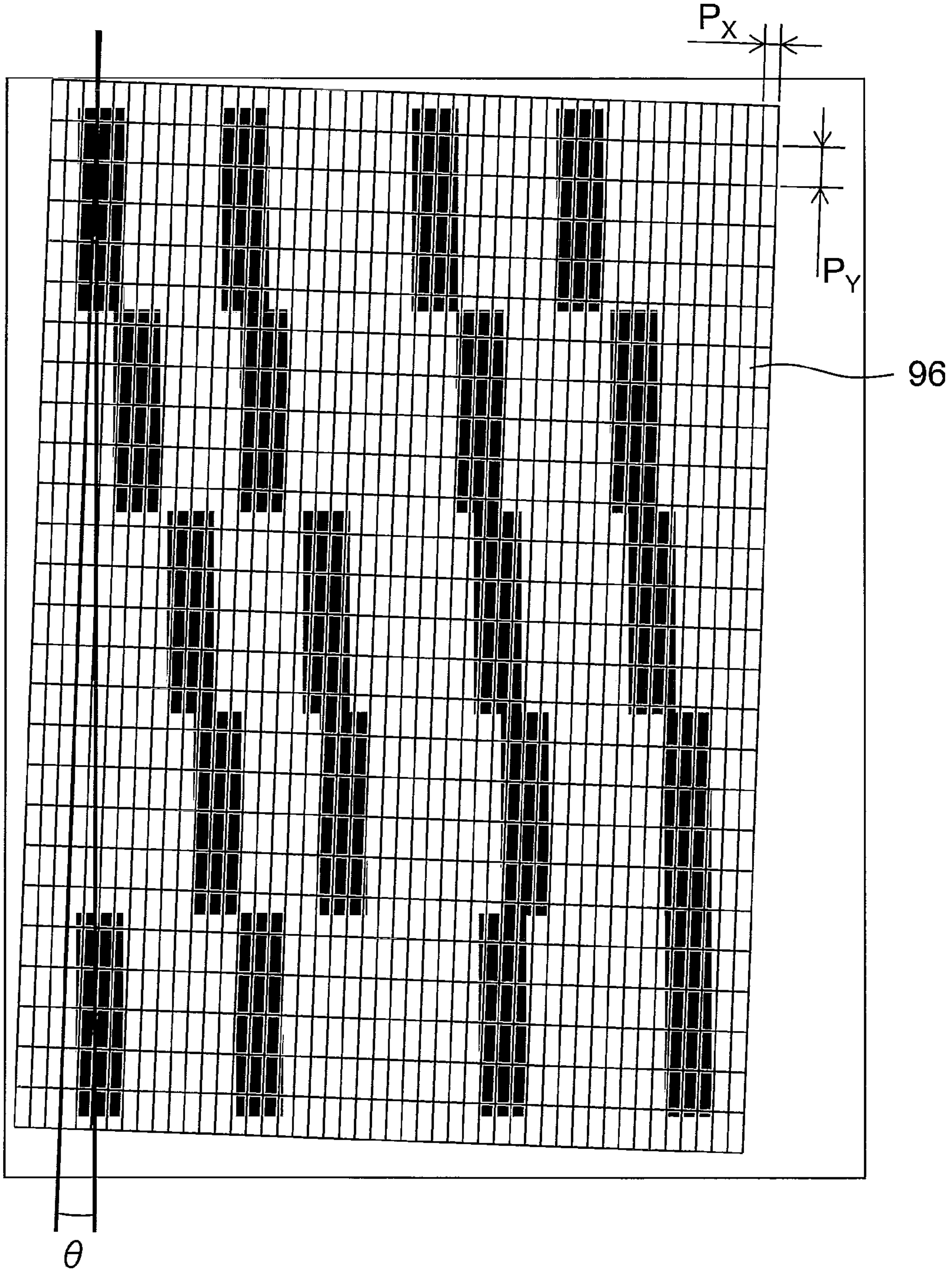
FIG. 11 is an explanatory diagram illustrating the relationship between a scanner co-ordinate system (reading co-ordinate system), and a dot position measurement line pattern.

FIG. 11 illustrates a relationship between the scanner co-ordinate system (reading co-ordinate system) and the dot position measurement line pattern. The scanner performs reading with its main scanning direction set to a high resolution (high accuracy) and with the scanner sub-scanning direction set to a low resolution. For example, when the recording resolution of the image forming apparatus is 1200 DPI, the main scanning resolution of the scanner is, according to the sampling theorem, desirably 2400 DPI or more, while the sub-scanning resolution is desirably a much lower resolution of 200 DPI or less. The lower limit of the sub-scanning resolution varies, based on the line length and the setting of A in AN+B mentioned earlier, but may be 100 DPI or 50 DPI, as long as the lower limit falls within the operating range of the scanner.

The desirable conditions for the reading resolution of the scanner is a reading resolution in the sub-scanning direction of within a range not more than one-tenth of the reading resolution in the main scanning direction but not less than one-sixtieth of the reading resolution in the main scanning direction.

When the printer apparatus has a recording resolution of 1200 DPI, the reading resolution is desirably 2400 DPI in the main scanning direction, while the sub-scanning resolution is desirably 50 to 200 DPI.

The main scanning resolution varies depending on the required measurement accuracy. For example, when the margin of error a σ0.4 (μm), the main scanning resolution desirably corresponds to 2400 DPI and the sub-scanning resolution is desirably no more than 200 DPI. The lower limit of the resolution is determined based on the number of 1 ON N OFF stages (N+1 stages) in the sampling chart and on the conditions that the line length L per stage is read based on NL pixels.

Note, as a constraint, that the (N+1 stages) in the sample chart should fit onto a single sheet of recording paper and be readable in a single reading operation.

In other words, it is required to satisfy the following inequalities (expressions 1 and 2).

$$(N+1)\times L>(N+1)\times NL/\text{Sub-scanning resolution} \quad \text{Expression 1}$$

$$\text{Longitudinal length of an } A3\text{-size to } A4\text{-size paper sheet} >(N+1)\times L \quad \text{Expression 2}$$

In the above expressions 1 and 2, NL is determined by the pixel count in the Y direction of the image averaging regions ROI, described subsequently, the number of ROI, and the shift amount in the Y direction of each ROI, and therefore NL is found by the following equality (Expression 3).

$$NL=(\text{Pixel count in } Y \text{ direction of ROI})+(\text{ROI number}-1)\times(\text{ROI shift amount}) \quad \text{Expression 3}$$

If (pixel count in Y direction of ROI)=10 pixels, (number of ROI (i.e. the above ROI number)=4, and (ROI shift amount)=2 pixels, then NL=10+(4−1)×2=16 (pixels), based on the above Expression 3.

If N=4 and L=2 (inches), then "the sub-scanning resolution>{(N+1)×NL}/{(N+1)×L}" is obtained based on Expression 1, ant therefore, the sub-scanning resolution >(NL/L)=16/2=8 (DPI).

As a further example, if N is 16, then L is 0.6 (inch) and sub-scanning resolution>16/0.6≈26 (DPI).

The cells (reference numeral 96) in the scanner co-ordinate lattice illustrated in FIG. 11 represent regions (single-pixel aperture) occupied by a single read pixel of the scanner. For illustrative purposes in FIG. 11, these cells have been drawn as rectangles proportioned such that the scanner sub-scanning pixel size ($P_y$) is approximately twice the scanner main scanning pixel size ($P_x$); however, the actual pixel aspect ratio mirrors the relationship between the main scanning resolution and the sub-scanning resolution of the scanner.

Note that even when a print of a dot position measurement line pattern to be read is carefully placed in the (flat bed) scanner, a rotation angle (θ) is formed between the dot position measurement line pattern and the scanner reading co-ordinate system.

When this rotation angle is not corrected, a certain error arises between line blocks due to the height of the line pattern. Hence, processing to correct this rotation angle is carried out in the present embodiment. Details on the rotation angle correction will be provided subsequently (step S108 in FIG. 13).

Figure 12:
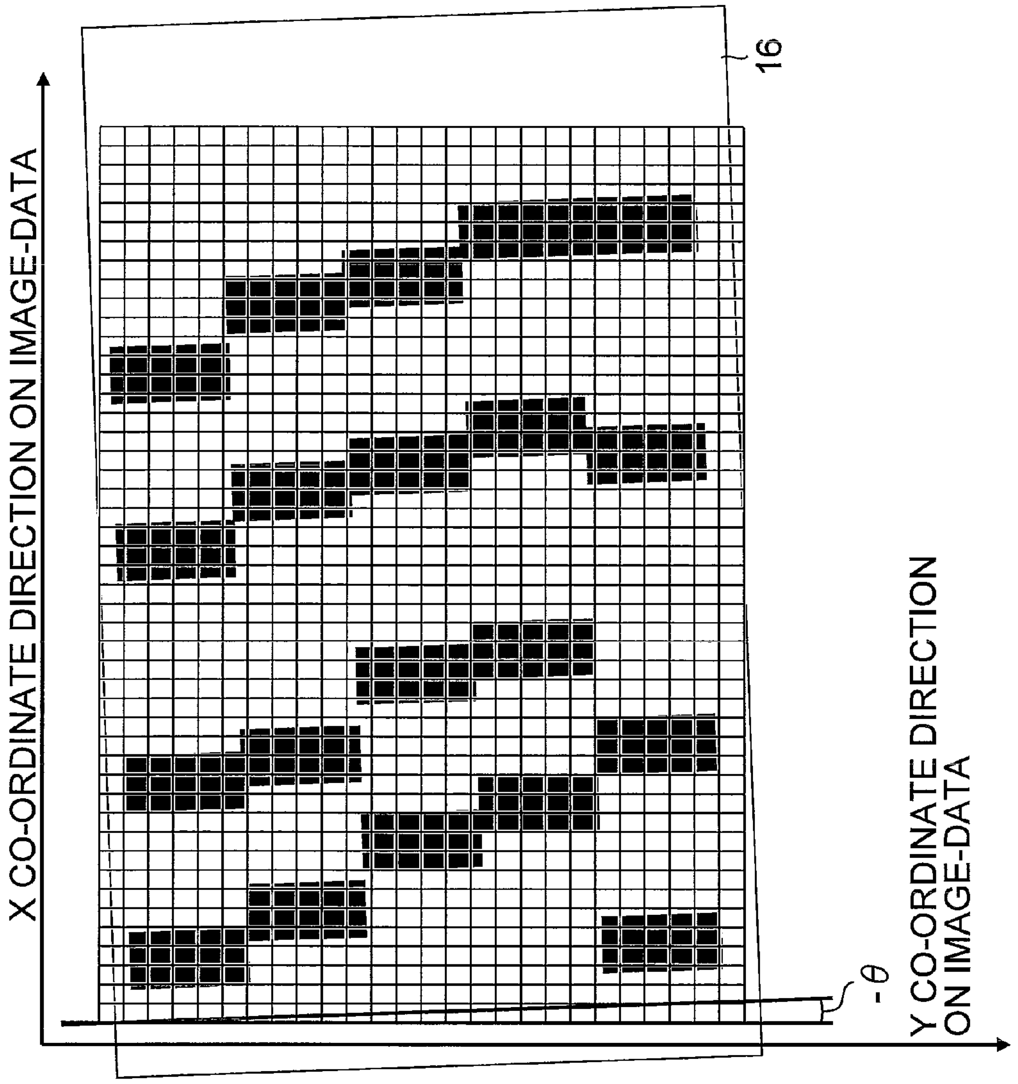
FIG. 12 illustrates a dot position measurement line pattern on a read image read with the scanner.

FIG. 12 illustrates a dot position measurement line pattern on an image read with the scanner (where the scanner pixels are represented as squares). The X co-ordinate of the image data is plotted in the scanner main scanning direction, and the Y co-ordinate of the image data is plotted in the scanner sub-scanning direction.

Analysis of Read Image Data

Figure 13:
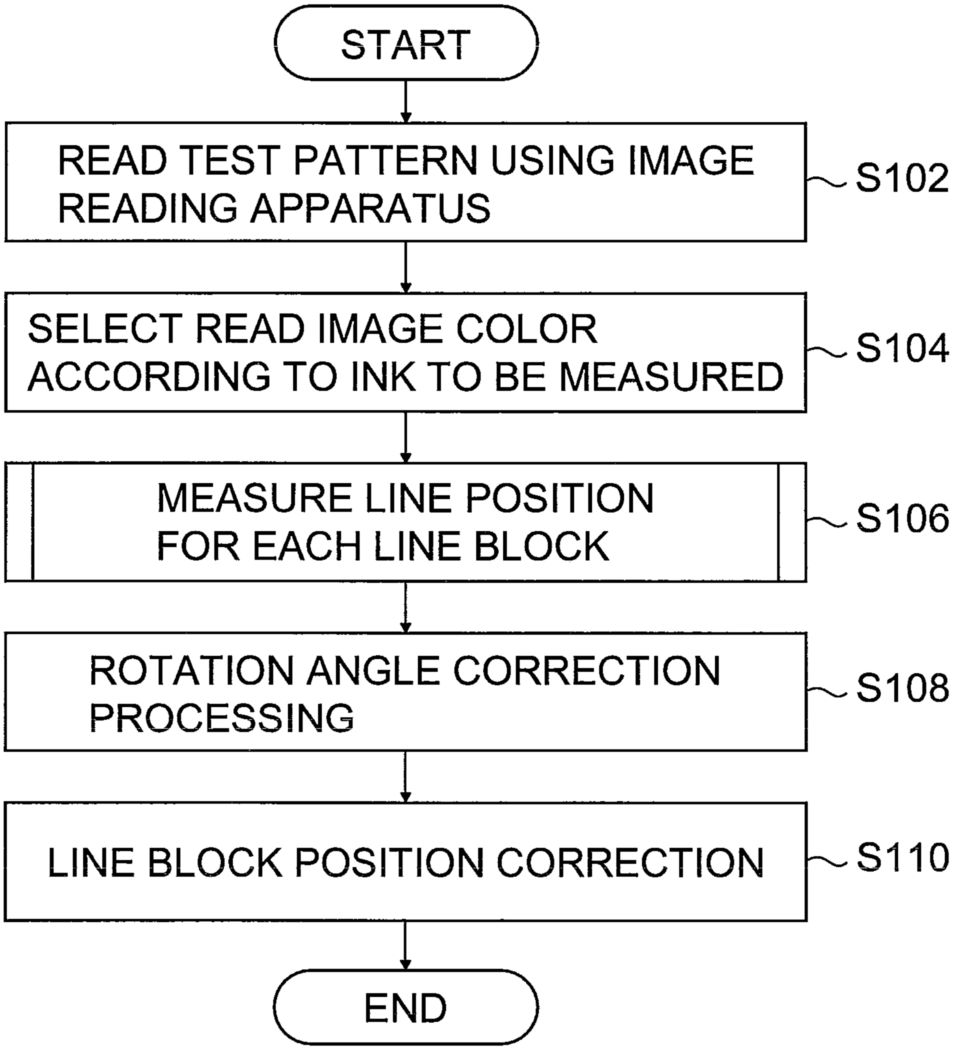
FIG. 13 is a flowchart showing the overall process flow of the dot position measurement.

FIG. 13 is a flowchart showing the process flow of the dot position measurement. Prior to the start of the measurement flow of FIG. 13, ink to be measured is dropped onto the recording paper 16 from each nozzle of the inkjet head while moving the recording paper 16 and the head 50 relatively to each other, so that a line pattern of dot rows corresponding to the respective nozzles is thus formed on the recording paper 16 from the ink ejected from each nozzle 51, as illustrated in FIG. 9. In other words, a sample chart (measurement chart), on which a line pattern is formed, is formed using the ink to be measured.

The line pattern thus obtained is then read using an image reading apparatus (scanner) (step S102 in FIG. 13). Here, as is illustrated in FIG. 10, with the line length direction oriented in the sub-scanning direction of the scanner, and the line row direction oriented in the main scanning direction of the scanner, the line pattern is imaged such that the resolution is high in the main scanning direction and low in the sub-scanning direction. Note that the scanner (not illustrated) includes a 3-line sensor (so-called "RGB line sensor") with a light-receiving element array for each of the colors R (red), G (green), and B (blue) with a color filter for each RGB color, and the whole surface (all the line blocks) of the sample chart are captured as electronic image data.

The colors in the read image are then selected according to the ink to be measured (step S104 in FIG. 13). In other words, captured image color channels are set according to the inks in the line pattern. An R channel (red channel) is set when the color of the ink is cyan (C), a G channel (green channel) is set when the ink is magenta (M), and a B channel (blue channel) is set when the ink is yellow (Y). A G channel is desirable when the ink is black ink, but an R channel is acceptable. In cases where other secondary color inks or ink of specialized colors are used, the channel selected among the scanner color channels is the channel allowing reading at the highest contrast when the ink to be measured is imaged, based on the relationship between the spectral reflectance of the ink recorded on the recording paper 16 and the spectral sensitivity of the scanner color channels. In other words, processing is carried out using one channel for each ink color.

The line block position on the image data thus read is then detected, and the line position is measured for each line block (step S106). The process flow of the position measurement in a line block of step S106 is shown in FIG. 14.

Position Measurement in Line Block

Figure 14:
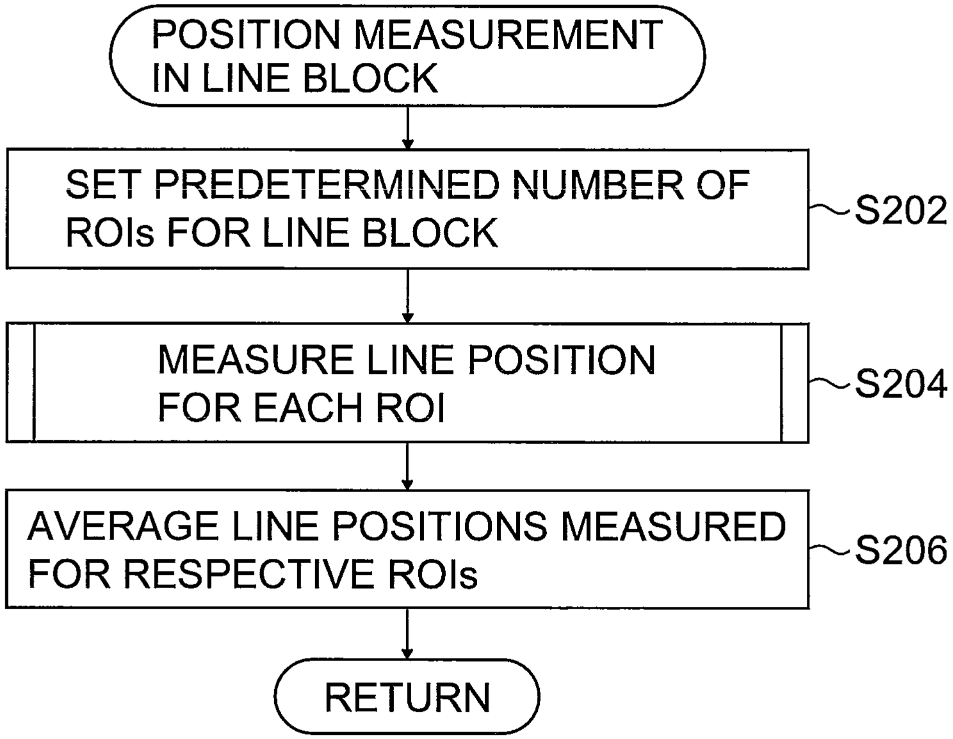
FIG. 14 is a flowchart showing the content of a position measurement processing in a line block.
Figure 15:
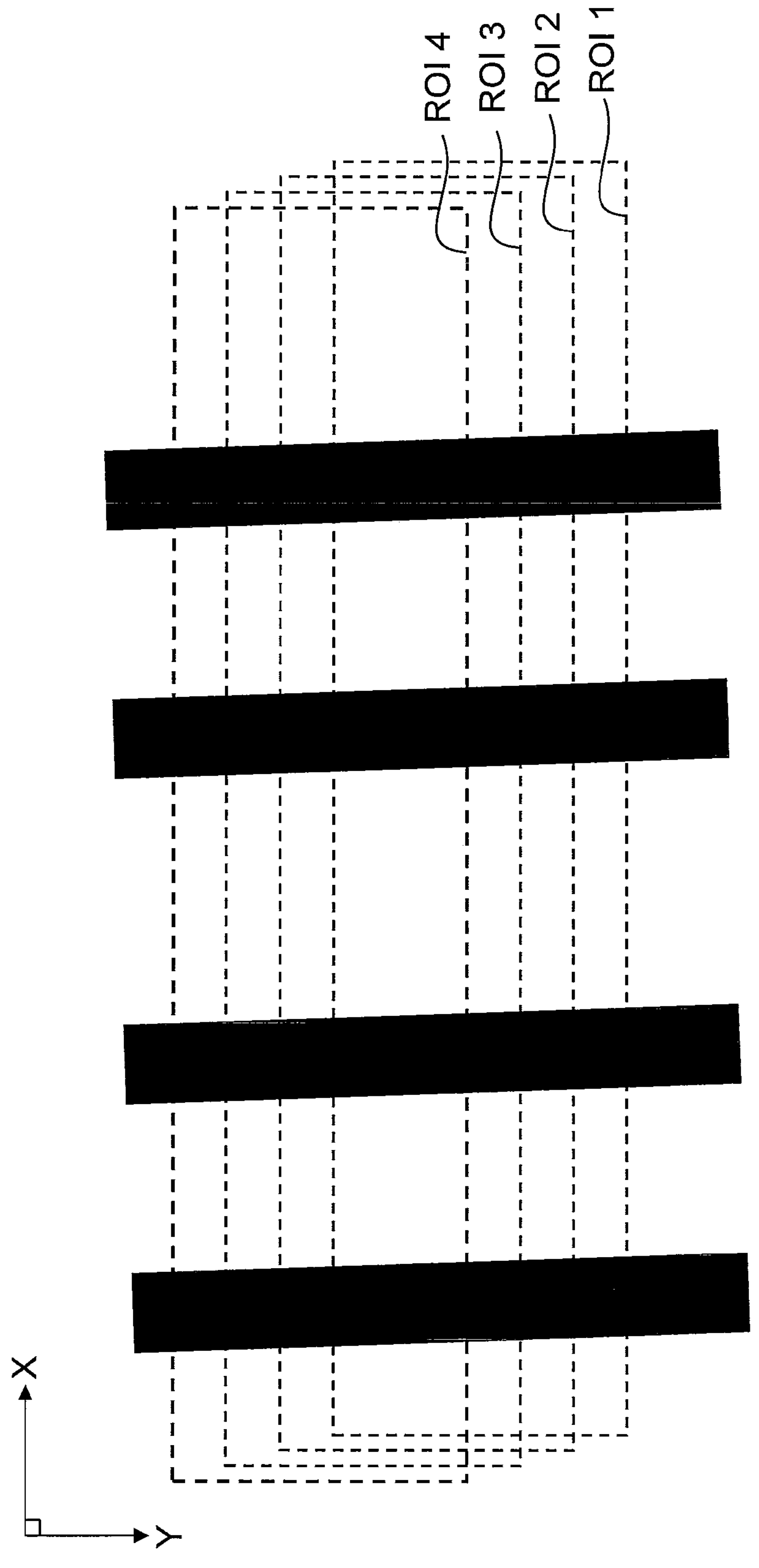
FIG. 15 illustrates an example of an explanatory diagram illustrating a configuration example of an image averaging region (ROI)

At the start of the position measurement process flow in a line block of FIG. 14, a prescribed number of image averaging regions ROI (Region Of Interest) are set for each line block (step S202). In other words, as illustrated in FIG. 15, a plurality of ROIs (Region Of Interest) are set for one line block. The ROIs specify regions of a prescribed shape (rectangular shape in FIG. 15) demarcating a part of the line blocks to be computed. FIG. 15 illustrates an example in which four regions ROI 1, ROI 2, ROI 3, and ROI 4 are set. Here, the ROIs are displaced relatively to one another with a certain pitch in a Y direction. For example, when the ROIs are displaced at a regular pitch of two pixels, ROI 2 is displaced two (2) pixels from ROI 1, ROI 3 is displaced four (4) pixels from ROI 1, and ROI 4 is displaced six (6) pixels from ROI 1, in the Y direction. If lines are not removed from the ROIs in an X direction, the ROIs need not to be displaced. However, in FIG. 15, the ROI 1 to ROI 4 are displaced with a regular pitch in the X direction to avoid an overlap therebetween to make the illustration clearer.

In this way, the line positions of each set of the ROIs are measured (step S204 in FIG. 14). In other words, the X co-ordinate is determined according to the flowcharts illustrated in FIGS. 16 and 17. The center positions of the ROI 1 to ROI 4 in the Y direction are used for the Y co-ordinate.

Figure 16:
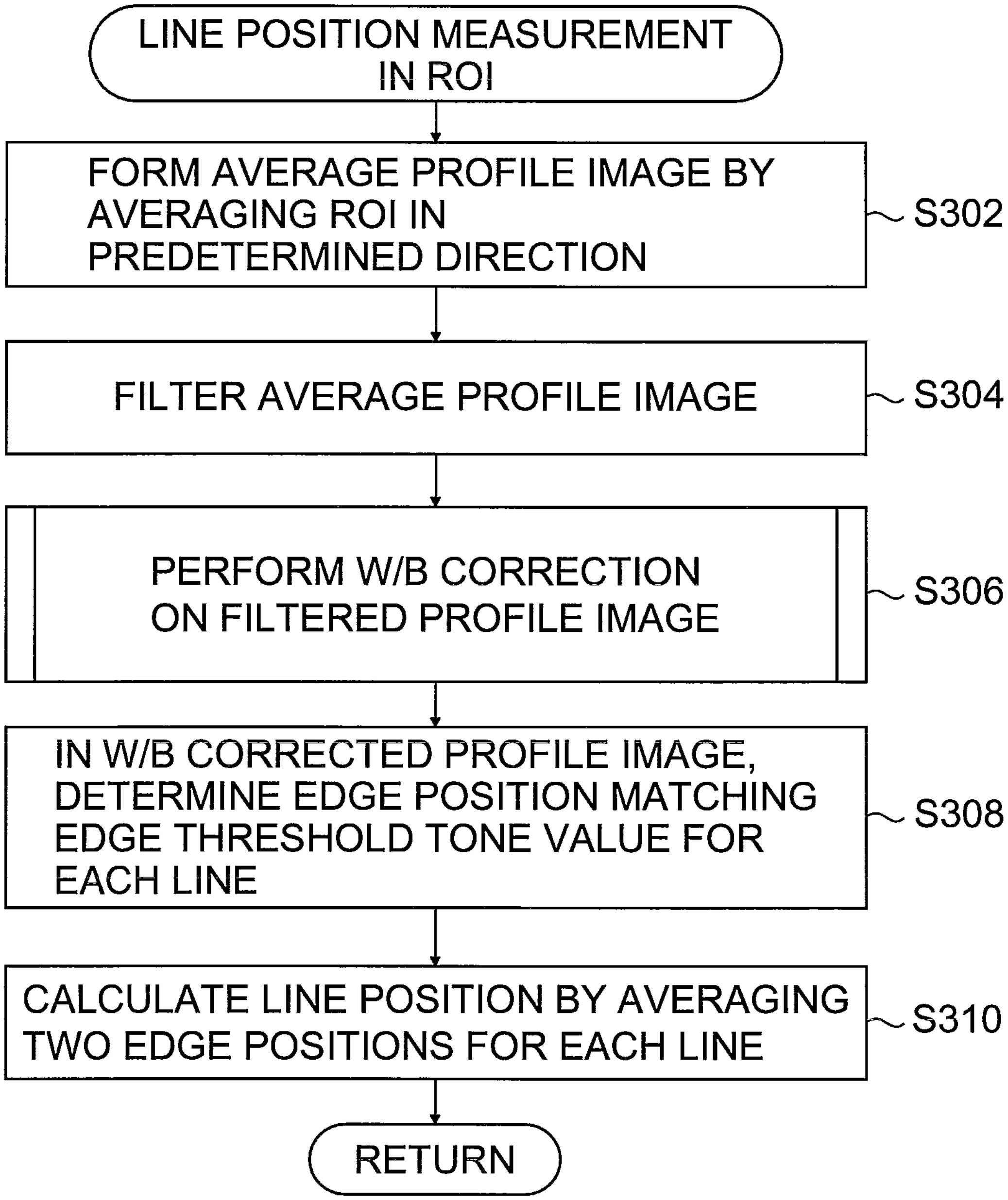
FIG. 16 is a flowchart showing the content of ROI line position measurement processing.

FIG. 16 shows the process flow of the line position measurement in the ROIs. At the start of the line block position measurement process flow in FIG. 16, average profile images are first created by averaging the image signal in the ROI in a predetermined direction, which is the scanner sub-scanning direction (Y co-ordinate direction) here (step S302).

Figure 18A:
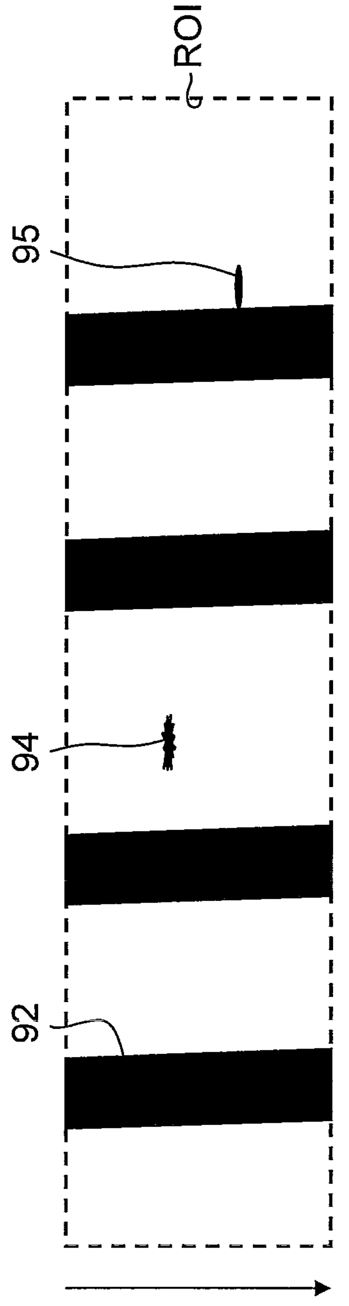
FIGS. 18A and 18B are explanatory diagrams illustrating an example of an average profile image calculated from the image averaging region (ROI)
Figure 18B:
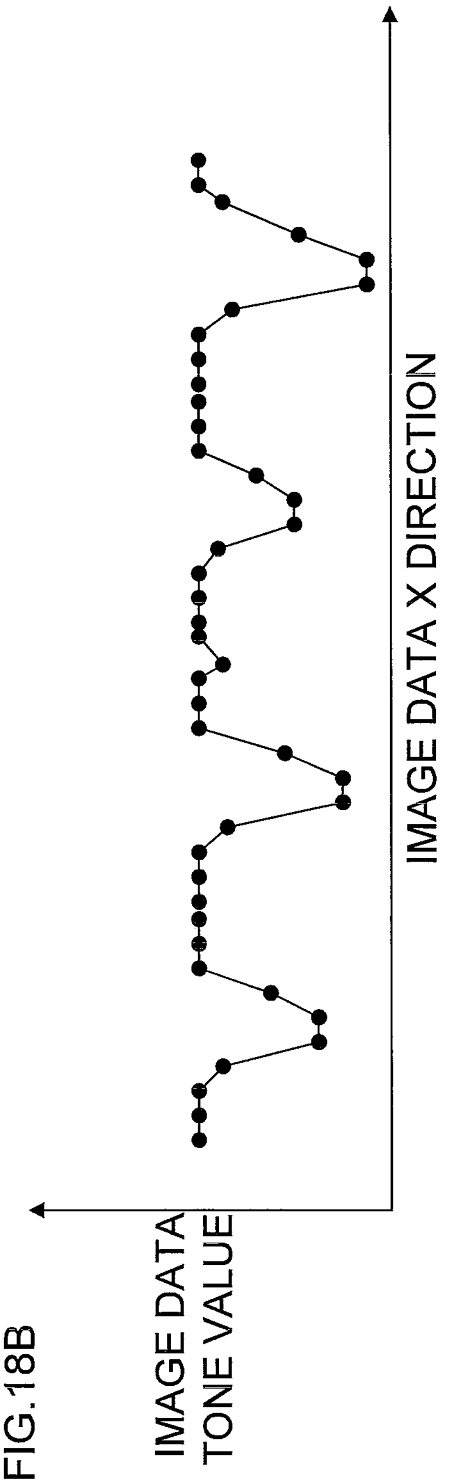

FIG. 18A is an example of one ROI to be computed, and FIG. 18B is an average profile image obtained from the ROI illustrated in FIG. 18A by averaging the image signal in terms of the line longitudinal direction (direction of the down arrow in the drawing). Note that, in FIG. 18B, the horizontal axis represents the position (pixel position) of the image data in the X direction, and the vertical axis represents the tone values of the image data thus read. Here, the higher the density of ink dots, the smaller the tone values; parts without dots (white ground parts of the recording paper 16) have large tone values.

Even when dirt 94 adheres to the dot position measurement line pattern as illustrated in FIG. 18A, or a satellite 95 (a sub-droplet known as a satellite droplet which separates from a main droplet during ink ejection is generated and this satellite droplet adheres to a different position on the recording paper 16 from the main droplet) is generated on the line 92, by performing averaging in the line longitudinal direction (direction of downward arrow in the drawing), the contrast of the dirt 94 decreases, and distortion of the profile images caused by the satellite 95 is reduced (see FIG. 18B).

Figure 19:
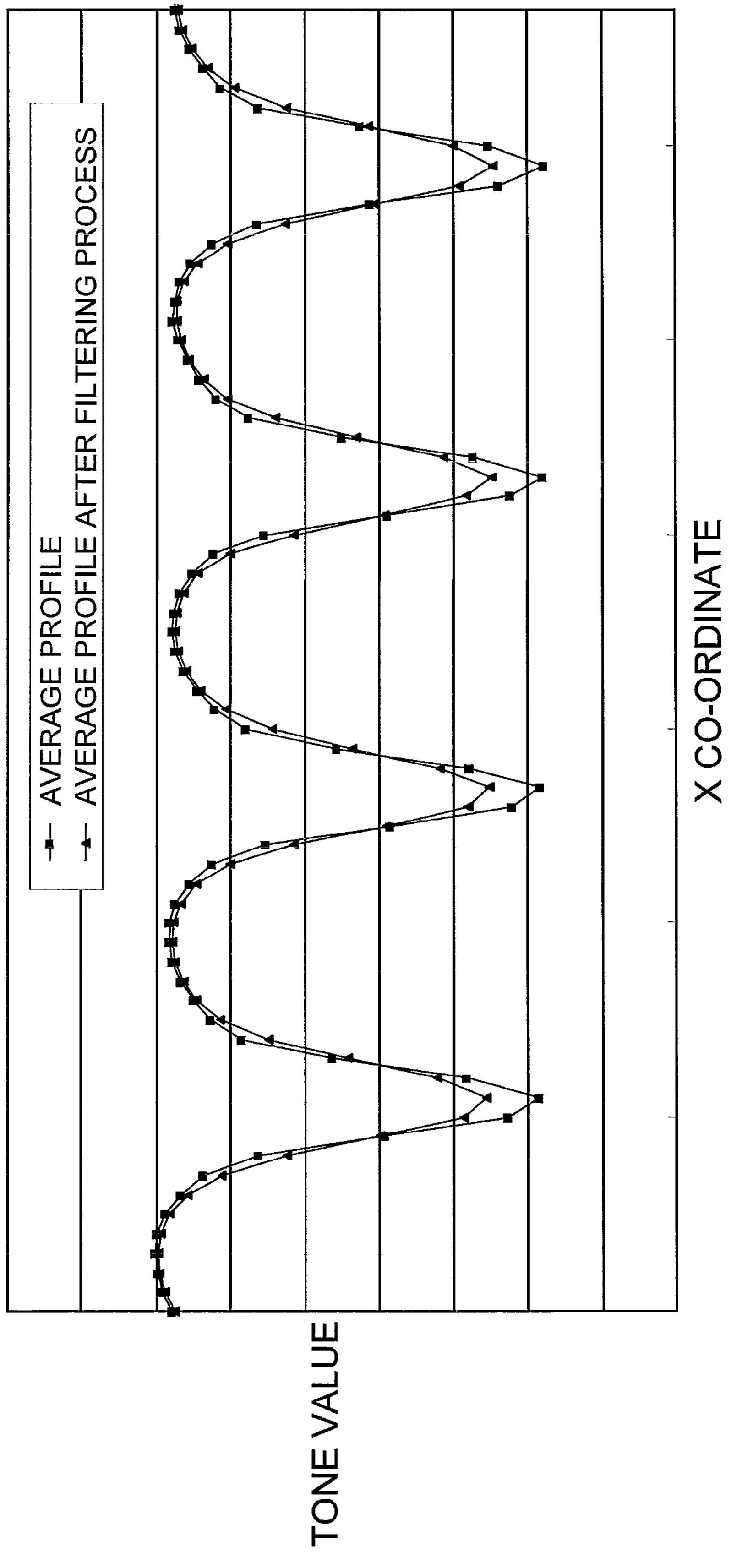
FIG. 19 is a graph showing results of a filtering process.

Subsequently, the average profile images thus created are smoothed by using a predetermined filter to create filtered profile images (X co-ordinate direction) (step S304 in FIG. 16). FIG. 19 shows the result of performing filtering of the averaged profile images, further lowering the dirt contrast, and reducing the distortion caused by the satellite. A linear filter with symmetry of about 5 to 9 taps is desirable from the standpoint of the processing speed and effects.

Figure 20:
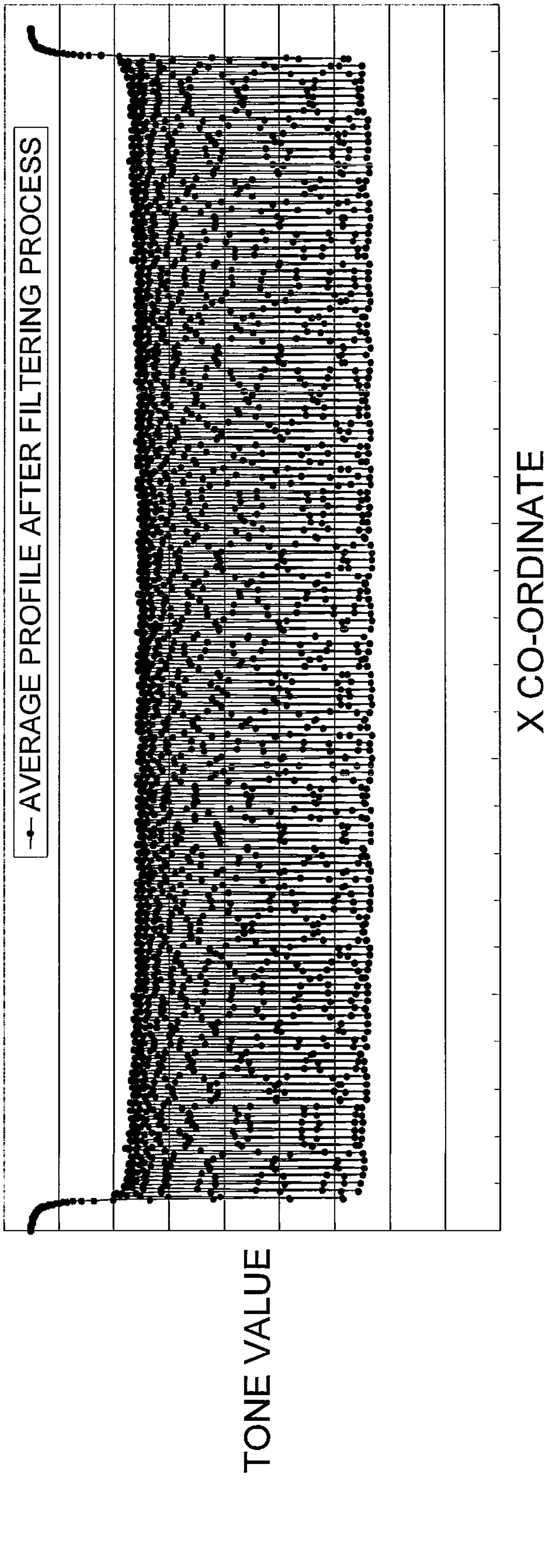
FIG. 20 is a graph showing fluctuations in the W/B level.

Although short-term distortion is corrected as a result of the filtering, variations in the long-term tone values due to shading (variations in the lighting brightness and the like) during the scanner reading, still remain as illustrated in FIG. 20. Such shading is a major cause of positional errors when using an algorithm to determine line positions from tone values. Hence, following the aforementioned filtering process (step S304 in FIG. 16), the filtered average profile images are subjected to W (white, white background)/B (black, ink) correction (step S306 in FIG. 16).

Figure 17:
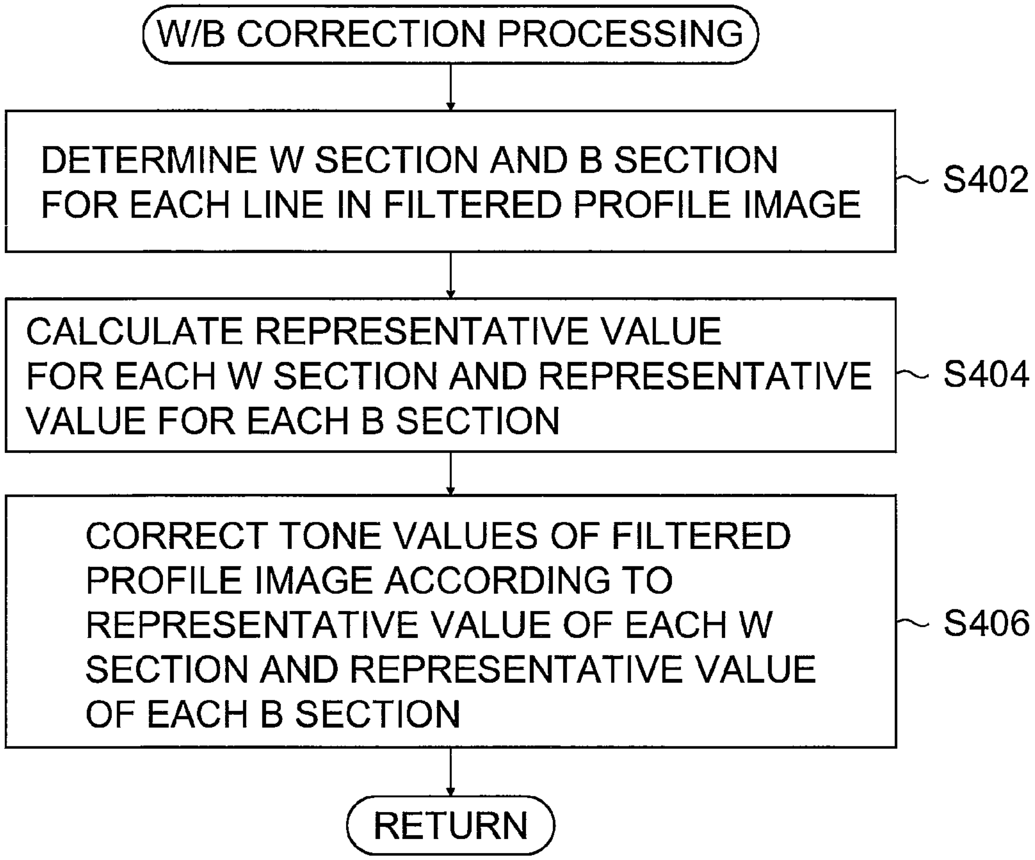
FIG. 17 is a flowchart showing the content of W(white, white ground)/B(black, ink) correction processing.

FIG. 17 shows the process flow for W/B correction processing. At the start of the W/B correction process flow in FIG. 17, W (white, white background) stretches and B (black, ink) stretches are set for each line in the filtered profile images (step S402), and representative values are determined for each of the W stretches and B stretches (step S404).

Figure 21:
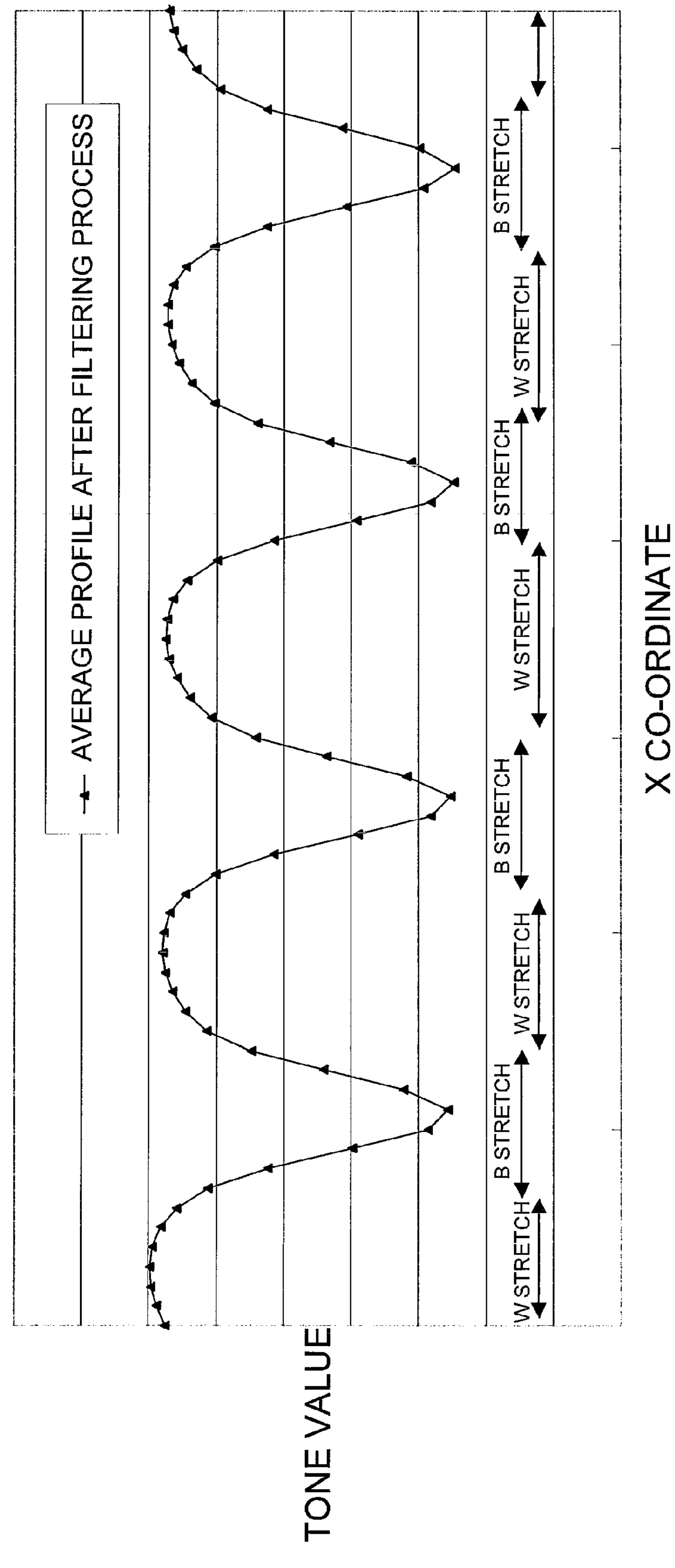
FIG. 21 is an explanatory diagram of W/B level correction.

FIG. 21 illustrates an aspect in which W (white, white background) stretches and B (black, ink) stretches are set for a filtered profile image. The W stretches and B stretches are laid on binarization processing based on a profile graph using a discrimination analysis method, and the result based on the binarization processing is further subjected to morphology processing (expansion is performed a predetermined number of times, and thinning is performed the same number of times), whereupon the results are set with the black pixels in the B stretches and white pixels in the W stretches. The B stretches thus occupy profile image dips (minimum values), and the W stretches occupy the profile image peaks (maximum values). An increase in black pixels by approximately a predetermined number of pixels may be set as a B stretch, while an increase in white pixels by approximately a predetermined number of pixels may be set as a W stretch.

For the W stretches determined in this way, tone values and positions representing the W stretches are found for the filtered profile images. A representative value is the maximum value in a W stretch, for example. The position of a W stretch is found using the center position of the W stretch. A representative tone value $W_{Li}$ and position $W_{Xi}$ are determined for each of the W stretches, $W_i$ (i=0, 1, 2, . . . ).

Likewise, for the B stretches, the tone value and position to represent a B stretch are determined for the filtered profile images The minimum value in the B stretch may be used as a representative value, for example. The position of a B stretch is found using the center position of the B stretch. A representative tone value $B_{Li}$ and position $B_{Xi}$ are determined for each of the B stretches $B_i$ (i=0, 1, 2, . . . ).

The tone values of the filtered profile images are corrected on the basis of the representative values for the W and B stretches thus determined (step S406 in FIG. 17). Note that W stretch corresponds to a "non-recording region", and B stretch corresponds to "recording region".

W/B Correction Processing

Each position X and tone value L are corrected for the filtered profile images as follows. In other words, an estimate value $W_L$ is found for an optional X by performing linear interpolation on the representative values $W_{Li}$ and $W_{Xi}$ in the determined W stretch. An estimate value $B_L$ is found for an optional X by performing linear interpolation on the representative values $B_{Li}$ and $B_{Xi}$ of the determined B stretch.

Supposing that the white tone value after W/B correction is $W_0$ and the black tone value is $B_0$, then L'=correction coefficient $K(L-B_L)+B_0$ correction coefficient $K=(W_0-B_0)/W_L-B_L)$, in other words, a linear transform is performed so that when the input value is $W_L$, the output value is $W_0$, and when the input value is $B_L$, the output value is $B_0$.

Once the processing to correct the W/B level in this manner (step S406) ends, a subroutine of FIG. 17 is completed and the processing return to the ROI line position measurement process flow of FIG. 16, and the processing advances to step S308 in FIG. 16. In step S308, in the W/B corrected profile image, an edge position (X co-ordinate) which matches a predetermined tone value (edge threshold tone value) is determined at two points (left and right) for each line.

Figure 22:
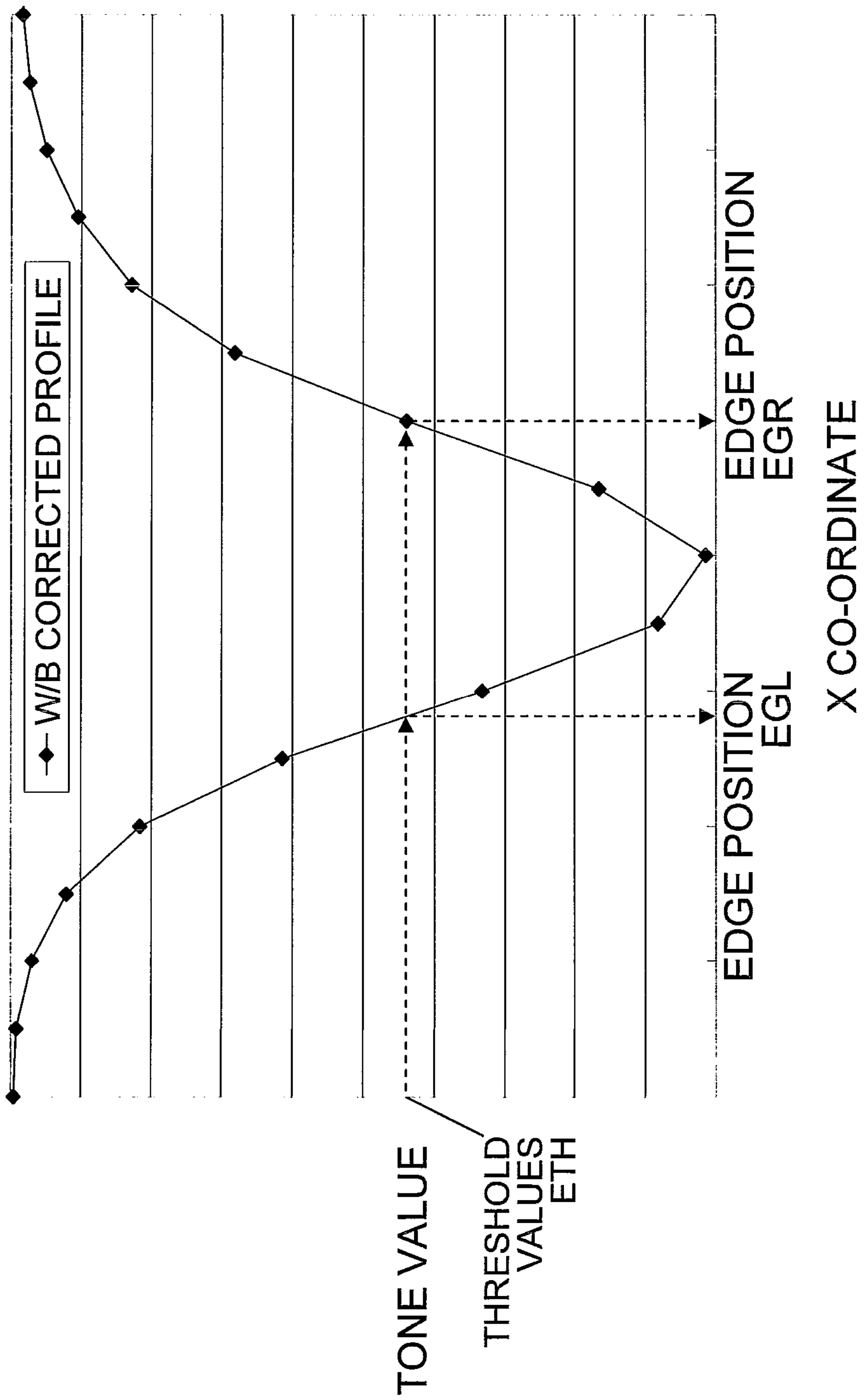
FIG. 22 is an explanatory diagram of an edge position determination method.

FIG. 22 illustrates an aspect in which, in the W/B corrected profile image, positions serving as threshold values ETH for defining the edges are determined with respect to the line at two forward and rear points (an edge position EGL on the left in FIG. 22 and an edge position EGR on the right).

In cases where W/B corrected profile image and the threshold values ETH do not accurately match, the edge positions can be determined using a publicly known interpolation algorithm. Linear or spline interpolation or cubic interpolation may be adopted as the publicly known interpolation algorithm.

The edge positions determined at two points of each line are then averaged for each line and the average value is determined as the line position (X co-ordinate) (step S310 of FIG. 16). The center position of the ROI in the Y co-ordinate direction is also determined as the Y co-ordinate of the line position. In other words, the Y co-ordinate is found using the center position of each ROI in the Y direction.

After the line positions corresponding to the ROI have been thus determined, a subroutine in FIG. 16 is completed, the processing returns to the position measurement process flow in a line block in FIG. 14 and the processing advances to step S206 of FIG. 14. In step S206, a position found by averaging the line positions measured for each of a plurality of ROIs (ROI 1 to ROI 4) is determined as the line position (X co-ordinate, Y co-ordinate) corresponding to the line block. The same or similar processing is performed for each line block to measure the line positions for each line block.

Note that the method of specifying the position of each line is not limited to a method of determining each line position from the aforementioned two edge positions. Other computation methods may also be adopted, such as determining line positions from extremums of a profile image, for example.

Physical Value Conversion

Information on the line positions determined as above corresponds to the pixel positions of the scanner co-ordinate system, and therefore these pixel positions are converted to physical units (gm units, for example). In other words, the line positions are converted into physical values by multiplying these values by coefficients corresponding to the main scanning resolution and the sub-scanning resolution.

In a case where the main scanning read resolution is 2400 DPI, for example, the coefficient is 25400/2400 (μm/dots). When the sub-scanning read resolution is 200 DPI, the coefficient is then 25400/200 (μm/dots). Computation to convert the pixel positions into physical values in gm units is performed by using these coefficients.

This physical value conversion is carried out in order to correct the difference between the main scanning resolutions and the sub-scanning resolutions before rotation correction is performed in steps S108 to S110 of FIG. 13.

Note that the conversion from a co-ordinate system for pixels of image data to a co-ordinate system on an actual recording medium is defined by a conversion expression using the aforementioned coefficients. Hence, which co-ordinate system is used in the computation and at which stage of the computation the co-ordinate conversion is performed, are optional.

Rotation Angle Correction

Figure 23:
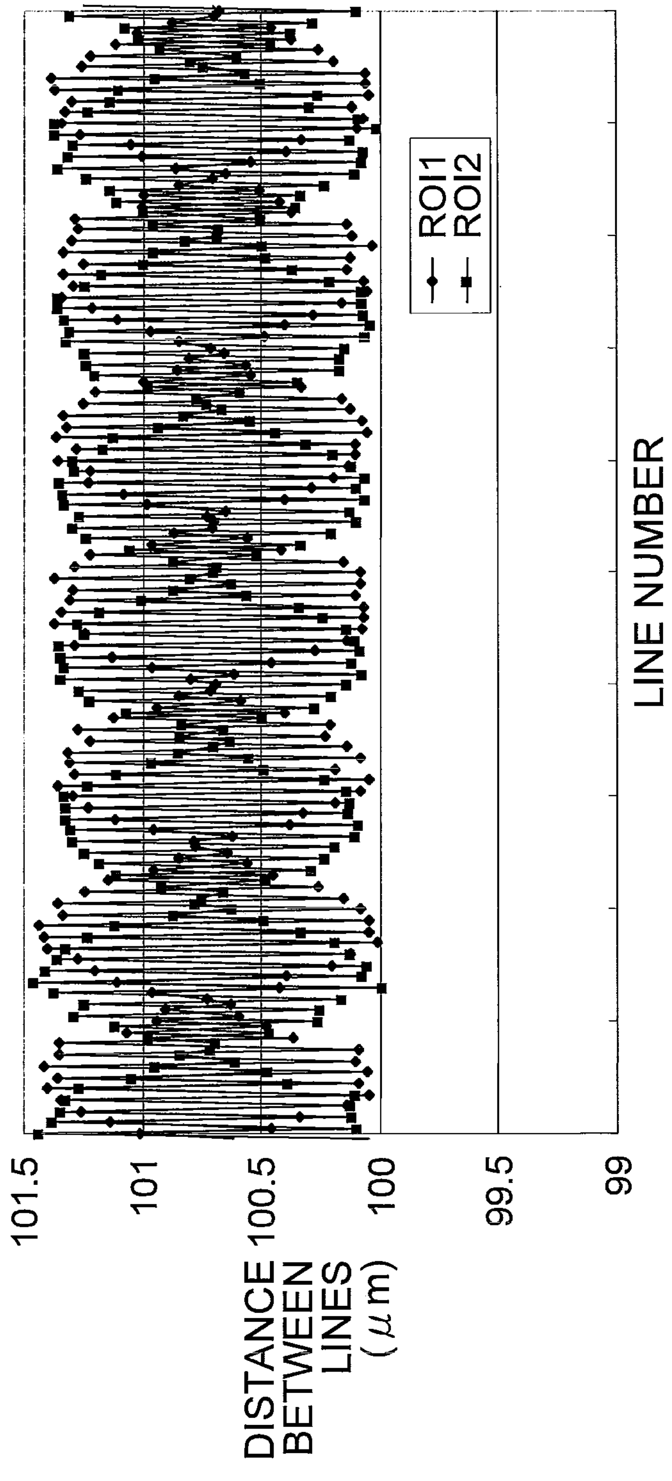
FIG. 23 is a graph showing line position measurement accuracy in each ROI.

FIG. 23 illustrates the result of reading calibrated line blocks created accurately with a 100-μm interval and converting the line positions (X co-ordinates) determined for ROI 1 and ROI2 to a line interval. Note that the center values deviate slightly from 100 μm because the rotation angle of the line blocks have not been corrected.

Figure 24:
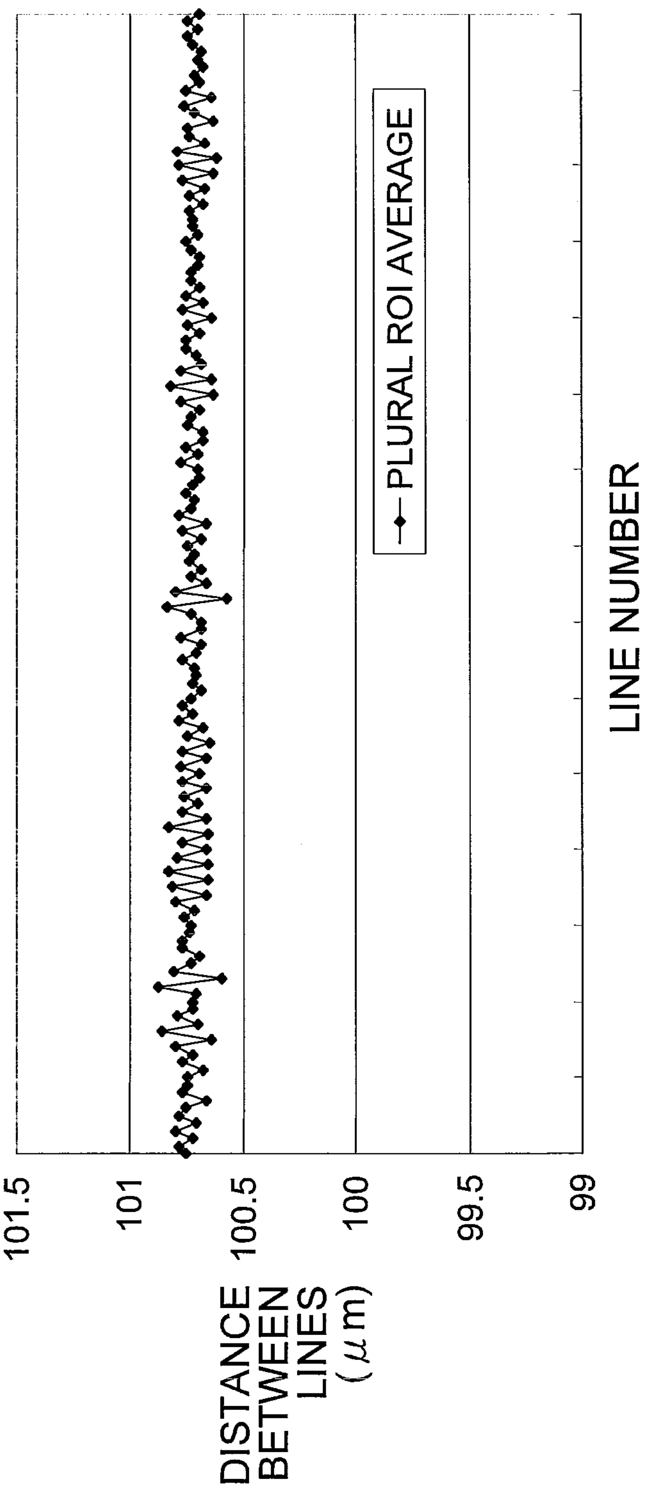
FIG. 24 is a graph showing measurement accuracy when a plurality of ROIs are averaged.

FIG. 24 illustrates the result of reading calibrated line blocks created accurately with a 100-μm interval as in FIG. 23, and converting the line position (X co-ordinate) obtained by averaging ROI 1 to ROI 4 to a line interval. As is clear when FIG. 24 is compared with FIG. 23, the interval in FIG. 24 approaches a fixed value since the inconsistencies in the line interval are reduced. In other words, it is clear that superior effects are obtained by averaging the line positions determined from a plurality of ROIs displaced in an orderly manner at a fixed interval.

As described hereinabove, the line positions of line blocks are determined for each line block by averaging the line positions measured in a plurality of ROIs, and upon completion of the processing of step S206 in FIG. 14, a subroutine of FIG. 14 is completed in order to return to the entire process flow of FIG. 13, whereupon the processing advances to step S108 in FIG. 13.

Figure 25:
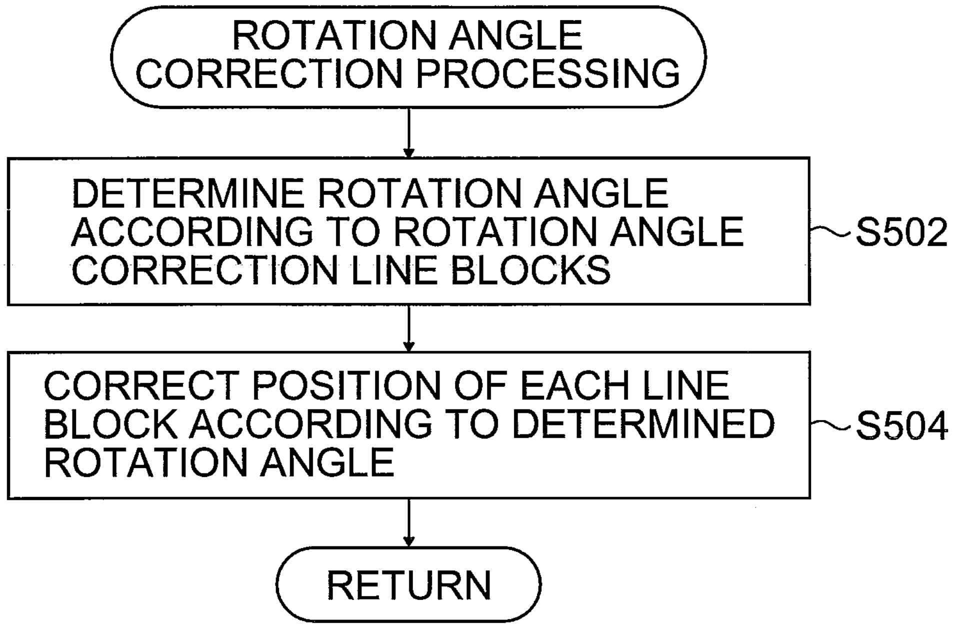
FIG. 25 is a flowchart showing the content of rotation angle correction processing.

A flowchart of rotation angle correction processing in step S108 is illustrated in FIG. 25. When the rotation angle correction process flow in FIG. 25 starts, the rotation angle is determined on the basis of a rotation correction line block (step S502). In other words, the rotation angle (see θ in FIG. 11) between the line pattern and the scanner reading co-ordinate is determined on the basis of the position co-ordinates of lines (line positions (X co-ordinate, Y co-ordinate) which are determined in step S106) which are formed by the same nozzle but which belong to different line blocks, among the line positions of the line blocks included in the measurement chart. Rotation correction is then performed on each line block position (that is, each line position) on the basis of the rotation angle (θ) thus found (step S504).

Calculation of Rotation Angle and Rotation Angle Correction

In this embodiment, line blocks 0 and 4 in FIG. 9 are used as rotation correction line blocks. After determining the line positions for line blocks 0 to 4 as is described in step S206 of FIG. 14, the positional co-ordinates of lines created by the same nozzle are found in line blocks 0 and 4.

Since, in this example, in line blocks 0 and 4, the lines are formed by the same nozzles having the nozzle numbers 0, 20, 40, 60, . . . , then the line positions for these common nozzle numbers can be used.

Suppose that the line position of nozzle number 0 belonging to line block 0 is $P_0@LB_0=(x_0\_LB_0, y_0\_LB_0)$ and the line position of nozzle number 0 belonging to line block 4 is $P_0@LB_4=(x_0\_LB_4, y_0\_LB_4)$.

The angle $\theta_0$ between the two positions can be determined from the relationship $\tan\theta_0=\Delta Y/\Delta X$, where $\Delta Y_0=y_0\_LB_4-y_0\_LB_0$, $\Delta X_0=x_0\_LB_4-x_0\_LB_0$.

The angles $\theta_{20}$, $\theta_{40}$, and $\theta_{60}$, and the like, are likewise found for other nozzle numbers, namely, nozzle 20, nozzle 40, and nozzle 60, and the like, and the average value of these angles is determined as the rotation angle θ. Rotation correction is performed using the rotation angle θ thus determined.

Each line position (x, y) for line blocks 0 to 3 is converted using rotation matrix R (−θ) to find a line position (x', y') with the rotation angle canceled out.

Thus, after performing rotation angle correction processing, a subroutine in FIG. 25 is completed to return to the full process flow of FIG. 13, whereupon the processing advances to step S110 of FIG. 13.

Figure 26:
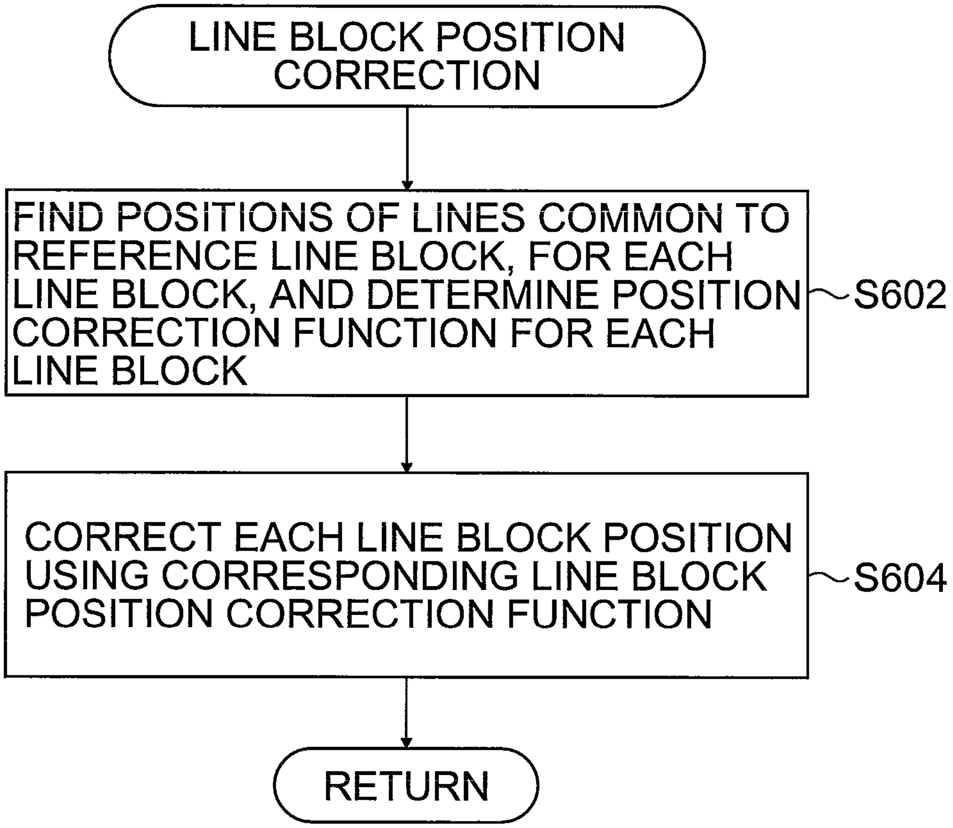
FIG. 26 is a flowchart showing the content of line block position correction processing.
Figure 30:
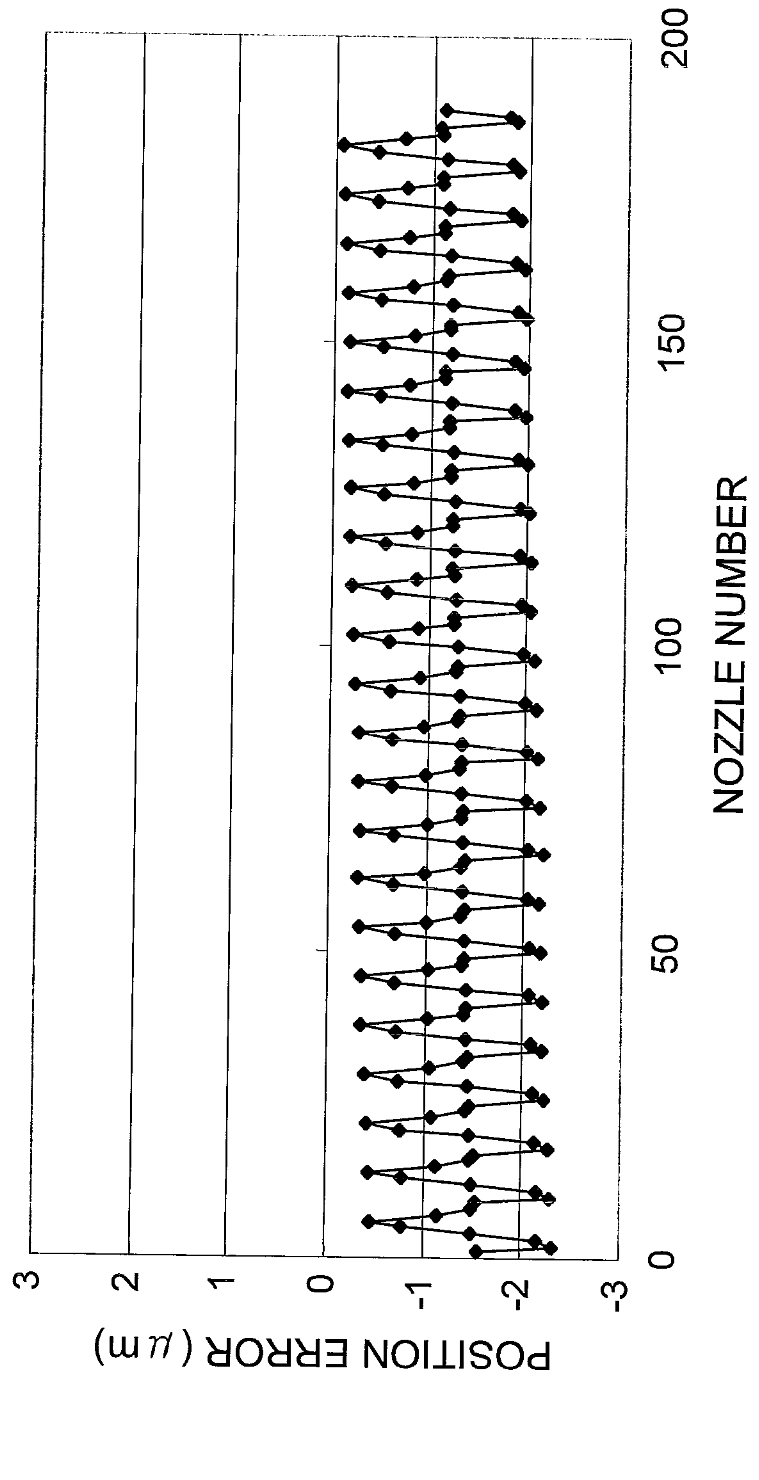
FIG.30 RELATED ART
FIG. 30 shows an example of the result of measuring dot position errors (after rotation angle correction) which correspond to respective nozzles.

An offset error, caused by a scanner for instance, remains even for a measurement value that has undergone rotation angle correction processing (see FIG. 30). Hence, position correction processing between line blocks is performed in step S110 in FIG. 13. A flowchart for the line-block position correction processing (step S110) is illustrated in FIG. 26. When the line block position correction process flow in FIG. 26 starts, lines formed by nozzles common to the reference line block are first detected for each line block, and for the detected lines, a correction function for which the measurement position (X co-ordinate) of the reference line block is the output value and each line block measurement position (X co-ordinate) is the input value, is determined for each line block using a commonly known method (least square method) (step S602). A correction function is thus obtained for each line block.

Thereafter, all the measurement positions (X co-ordinates) of the respective line blocks are transformed using the corresponding correction functions thus determined (step S604). The determined dot positions are the X co-ordinates obtained after conversion using the correction functions.

Line Block Position Correction

Here, position correction between line blocks will be described using a specific example. Position correction is carried out for each of line blocks 0 to 3, but line block 0 will be described here.

Line measurement positions (nozzle numbers 0, 20, 40, 60, 80 . . . ) of the same nozzle numbers between line block 0 and line block 4 (reference line block) are detected.

The measurement positions (X co-ordinates) of line block 0 are $lb_0\_x_0$, $lb_0\_x_4$, $lb_0\_x_8$, and so on.

The measurement positions (X co-ordinates) of line block 4 are $lb_4\_x_0$, $lb_4\_x_{20}$, $lb_4\_x_{40}$, and so on.

The measurement positions of nozzle numbers common to the two blocks are as follows.

A correction function $f_0$, for $y=f_0(x)$, is determined using the positions of common nozzle numbers of $X=\{lb_0\_x_0, lb_0\_x_{20}, lb_0\_x_{40}, lb_0\_x_{60}, \ldots)\}$ and $Y=\{lb_4\_x_0, lb_4\_x_{20}, lb_4\_x_{40}, lb_4\_x_{60}, \ldots\}$.

If the cause of scanner variation is only an offset error, the correction function may determine $a_0$ for $Y=X+a_0$ (zero-order function) using the least square method. In cases where minute carriage rotation is problematic, $a_0$ and $a_1$ are determined for $Y=a_1 \times X+a_0$ (first-order function) using the least square method. A deformation-based correction function may also be employed for paper deformation. When paper deformation and the scanner combine to cause errors, a paper deformation model×scanner deformation model may be selected for the correction function.

Typically, the polynomial $Y=\Sigma a_i \times X\hat{\ }i(i=0, \ldots n)$ can be used. Note that the reference symbol "^" in the equation expresses exponentiation (power) processing.

The measurement position (X co-ordinate) $\{lb_0\_x_0, lb_0\_x_4, lb_0\_x_8, \ldots\}$ of line block 0 is transformed by using the correction function $f_0(x)$ determined in this manner.

Similarly for line blocks 1 and 4, a correction function $f_1(x)$ is determined from the measurement positions of nozzle numbers common to both blocks, and the correction function $f_1(x)$ thus determined is used to transform the measurement positions (X co-ordinates) $\{lb_1\_x_1, lb_{1\_x}5, lb_1\_x_9, \ldots\}$ of line block 1.

Likewise for line blocks 2 and 3, correction functions $f_2(x)$ and $f_3(x)$ respectively are determined, and the correction functions $f_2(x)$ and $f_3(x)$ thus determined are used to transform the measurement positions (X co-ordinates) of line blocks 2 and 3 respectively.

Thus, because the position of each line block is corrected with the position of the same reference line block serving as a reference, mutual line block position errors can be reduced. Furthermore, with regard to paper deformation, even though the extent of deformation differs for line blocks 0 to 3, measurement errors due to paper deformation can be reduced because correction is performed based on the reference line block.

Dot Position Determination

The corrected line position X co-ordinate is the dot position which corresponds to the nozzle number. Scatter information for the deposition positions of dots from respective nozzles are thus obtained and can be used in processing for unevenness correction and so on.

Measure for Further Improving Measurement Accuracy

In order to improve the accuracy for line block 4 serving as the reference block in particular, desirably, the ROI multiplicity is increased, the line length is extended, and the averaging range is expanded. Furthermore, by arranging a plurality of line blocks 4 (reference line block) in the measurement chart and using a position obtained by statistically processing a plurality of the measurement results as the position of the reference line block, the influence of scanner locality can be effectively reduced.

Operating Effects of this Embodiment.

In this embodiment, the direction of the dot impact positions on the test pattern to be measured is the same as the main scanning direction of the scanner (FIG. 10), and hence reading is performed by lowering the scanner reading resolution in the sub-scanning direction with respect to that of the main scanning direction (FIG. 11). This allows even commercially available scanners to read a whole A3 page in one pass and allows the measurement time to be shortened.

Furthermore, the amount of read image data is approximately 257 MB (at 2400 DPI for main scanning and 200 DPI for sub-scanning) and therefore small. This leads to a valuable reduction in the data processing time and prevents the computer performance required for this processing from increasing. Hence, the highly accurate dot position measurement which is aimed at can be implemented at relatively low cost.

Moreover, in this embodiment, an average profile image, obtained by performing a partial averaging in terms of the line longitudinal direction (sub-scanning direction of the scanner) when determining a line position in a read image, is formed, and this average profile image is subjected to a filter process. Scattering of ink (satellite droplets) and the contrast of dirt are relatively lowered due to the aforementioned reading at a low resolution in the sub-scanning direction, the averaging, and the filtering process. As a result, there is no requirement for a special method of removing dirt.

Furthermore, the averaging processing simultaneously reduces the adverse effect of irregular noise in the averaging direction, which has the effect of increasing the reliability of tone values and improving the accuracy of the algorithm for determining the position based on these tone values. The filtering process also reduces irregular noise components and sampling distortion, thereby smoothing the profile image and improving reliability in terms of the line position.

Furthermore, as a result of the processing (W/B correction processing) to correct tone values, in an averaged profile image, on the basis of the white background close to each line and the ink density, distortion of the profile image, caused by the effects of scanner flare or disruption of the recording paper, is corrected, together with reducing the shading of the scanner in the main scanning direction. Positional accuracy based on tone values can be improved by correcting the tone values in this way.

Moreover, with this embodiment, a line position is calculated by using a plurality of average profile images with regions (ROI) for calculating the average profile displaced from one another by a fixed amount in a line longitudinal direction, and the plurality of line positions obtained are averaged. This processing adjusts the relative positional relationship (so-called sampling phase) between the read lines and scanner reading elements, thereby improving the line position accuracy still further.

Furthermore, according to the present embodiment, a reference line block which includes lines formed approximately uniformly by the same nozzles for each line block on the line pattern to be measured, is disposed (FIG. 9). The measurement position of each line block is corrected by taking the reference line block as a reference point, and the effect of disruption of the read image lattice, caused by a variation in the position of the scanner carriage, can be reduced. Measurement in which the effect of paper deformation is reduced is also possible through this correction mechanism.

Example of Composition of Dot Position Measurement Apparatus

Next, an example of the composition of a dot position measurement apparatus which uses the dot position measurement method described above will be explained. A program (dot position measurement processing program) is created which causes a computer to execute the image analysis processing algorithm used in the dot position measurement according to the present embodiment, and by running a computer on the basis of this program, it is possible to cause the computer to function as a calculating apparatus for the dot position measurement apparatus.

FIG. 25 is a block diagram illustrating an example of the composition of a dot position measurement apparatus. The dot position measurement apparatus 200 illustrated in FIG. 31 comprises a flatbed scanner which forms an image reading apparatus 202 (equivalent to the scanning apparatus 130 in FIG. 9C), and a computer 210 which performs calculations for image analysis, and the like.

The image reading apparatus 202 is provided with an RGB line sensor which images the line patterns for measurement, and also comprises a scanning mechanism which moves this line sensor in the reading scanning direction (the scanner sub-scanning direction in FIG. 10), a drive circuit of the line sensor, and a signal processing circuit, or the like, which converts the output signal from the sensor (image capture signal), from analog to digital, in order to obtain a digital image data of a prescribed format.

The computer 210 comprises a main body 212, a display (display device) 214, and input apparatuses, such as a keyboard and mouse (input devices for inputting various commands) 216. The main body 212 houses a central processing unit (CPU) 220, a RAM 222, a ROM 224, an input control unit 226 which controls the input of signals from the input apparatuses 216, a display control unit 228 which outputs display signals to the display 214, a hard disk apparatus 230, a communications interface 232, a media interface 234, and the like, and these respective circuits are mutually connected by means of a bus 236.

The CPU 220 functions as a general control apparatus and computing apparatus (computing device). The RAM 222 is used as a temporary data storage region, and as a work area during execution of the program by the CPU 220. The ROM 224 is a rewriteable non-volatile storage device which stores a boot program for operating the CPU 220, various settings values and network connection information, and the like. An operating system (OS) and various applicational software programs and data, and the like, are stored in the hard disk apparatus 230.

The communications interface 232 is a device for connecting to an external device or communications network, on the basis of a prescribed communications system, such as USB (Universal Serial Bus), LAN, Bluetooth (registered trademark), or the like. The media interface 234 is a device which controls the reading and writing of the external storage apparatus 238, which is typically a memory card, a magnetic disk, a magneto-optical disk, or an optical disk.

In the present embodiment, the image reading apparatus 202 and the computer 210 are connected via a communications interface 232, and the data of a captured image which is read in by the image reading apparatus 202 is input to the computer 210. A composition can be adopted in which the data of the captured image acquired by the image reading apparatus 202 is stored temporarily in the external storage apparatus 238, and the captured image data is input to the computer 210 via this external storage apparatus 238.

The image analysis processing program used in the method of measuring the dot positions according to an embodiment of the present invention is stored in the hard disk apparatus 230 or the external storage apparatus 238, and the program is read out, developed in the RAM 222 and executed, according to requirements. Alternatively, it is also possible to adopt a mode in which a program is supplied by a server situated on a network (not illustrated) which is connected via the communications interface 232, or a mode in which a computation processing service based on the program is supplied by a server based on the Internet.

The operator is able to input various initial values, by operating the input apparatus 216 while observing the application window (not illustrated) displayed on the display monitor 214, as well as being able to confirm the calculation results on the monitor 214.

Furthermore, the data resulting from the calculation operations (measurement results) can be stored in the external storage apparatus 238 or output externally via the communications interface 232. The information resulting from the measurement process is input to the inkjet recording apparatus via the communications interface 232 or the external storage apparatus 238.

Modified Embodiment

Figure 27:
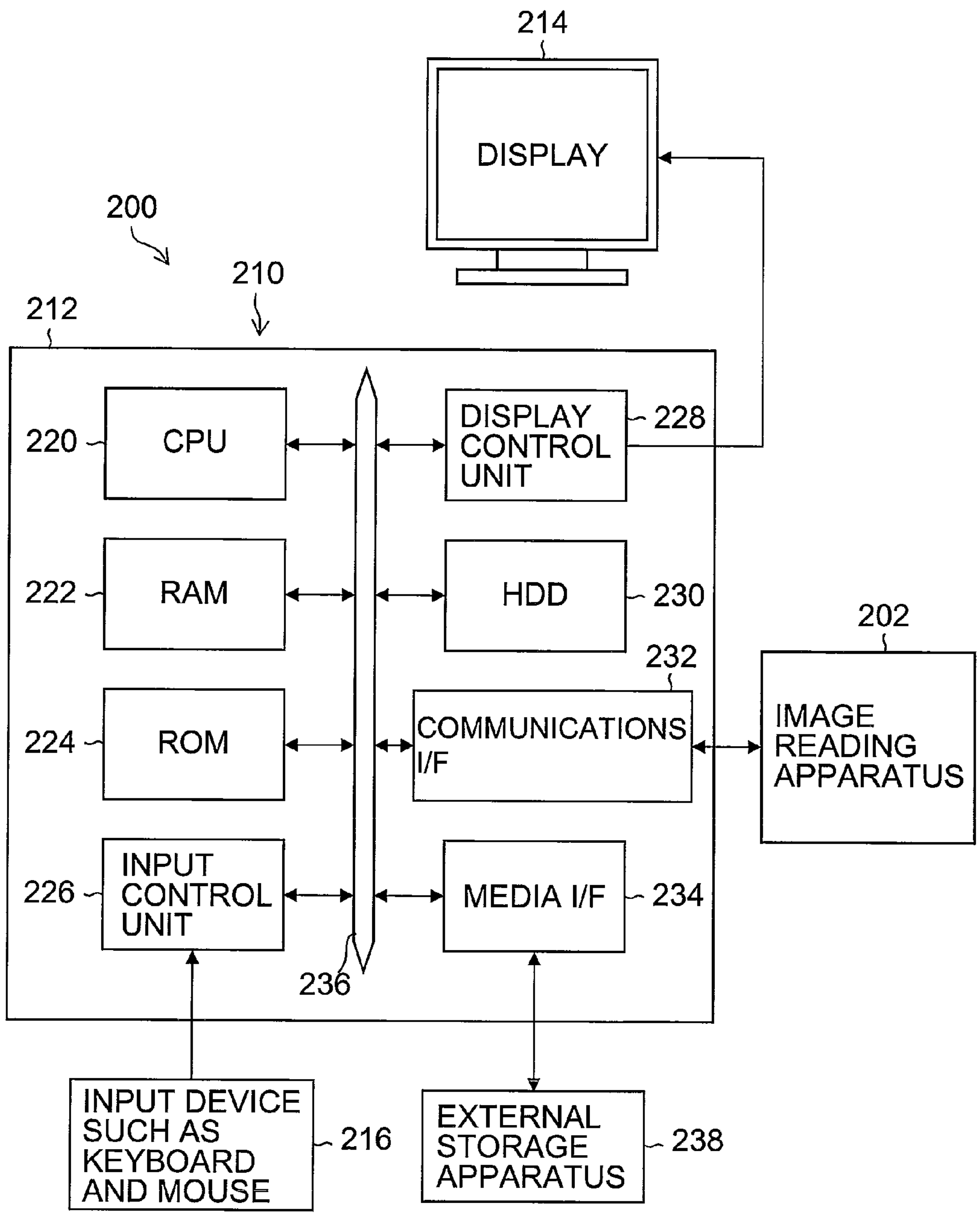
FIG. 27 is a block diagram illustrating an example of the composition of a dot position measurement apparatus.
Figure 28:
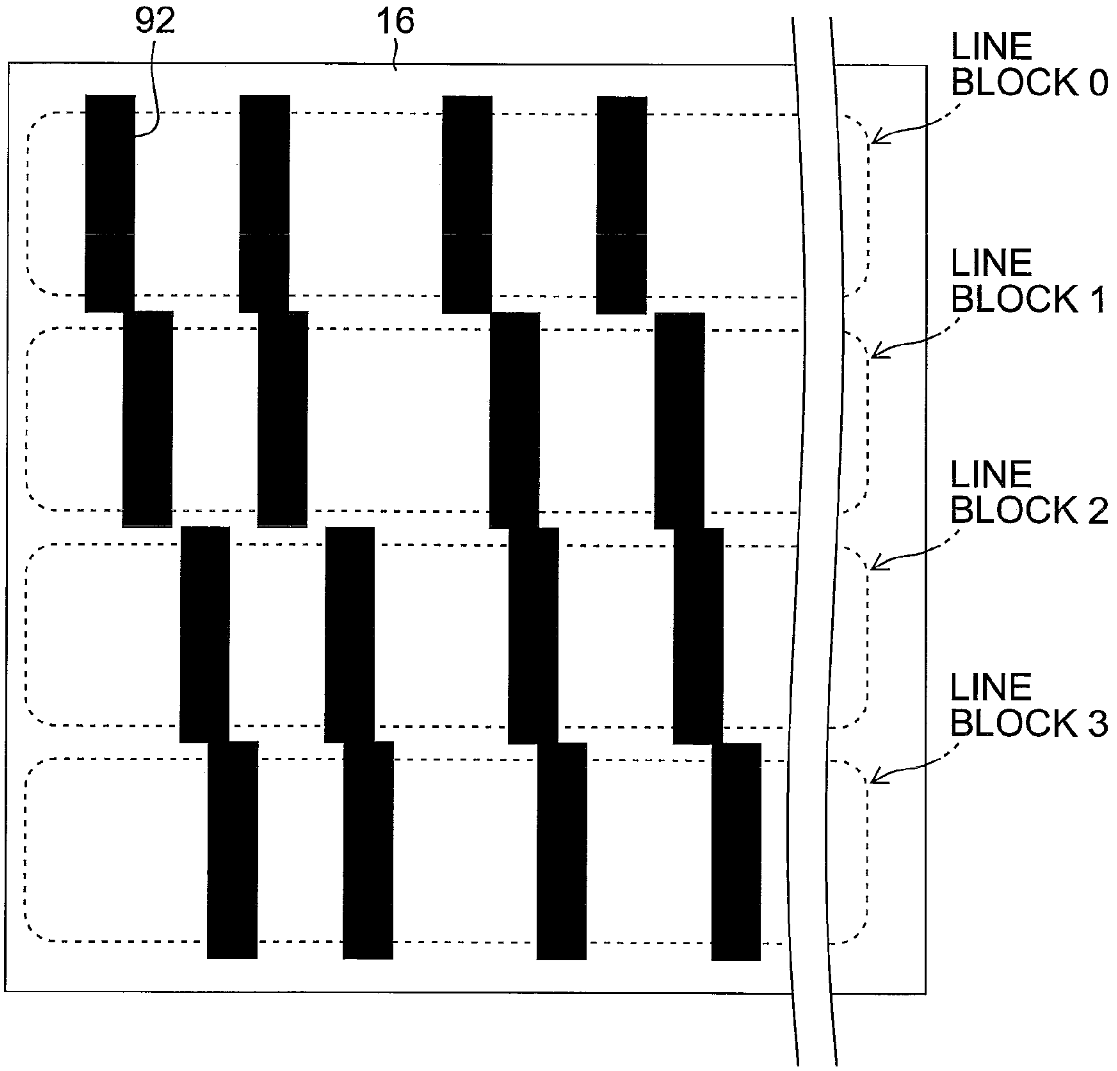
FIG.28 RELATED ART
FIG. 28 illustrates an example of a dot position measurement line pattern in the related art.
Figure 29:
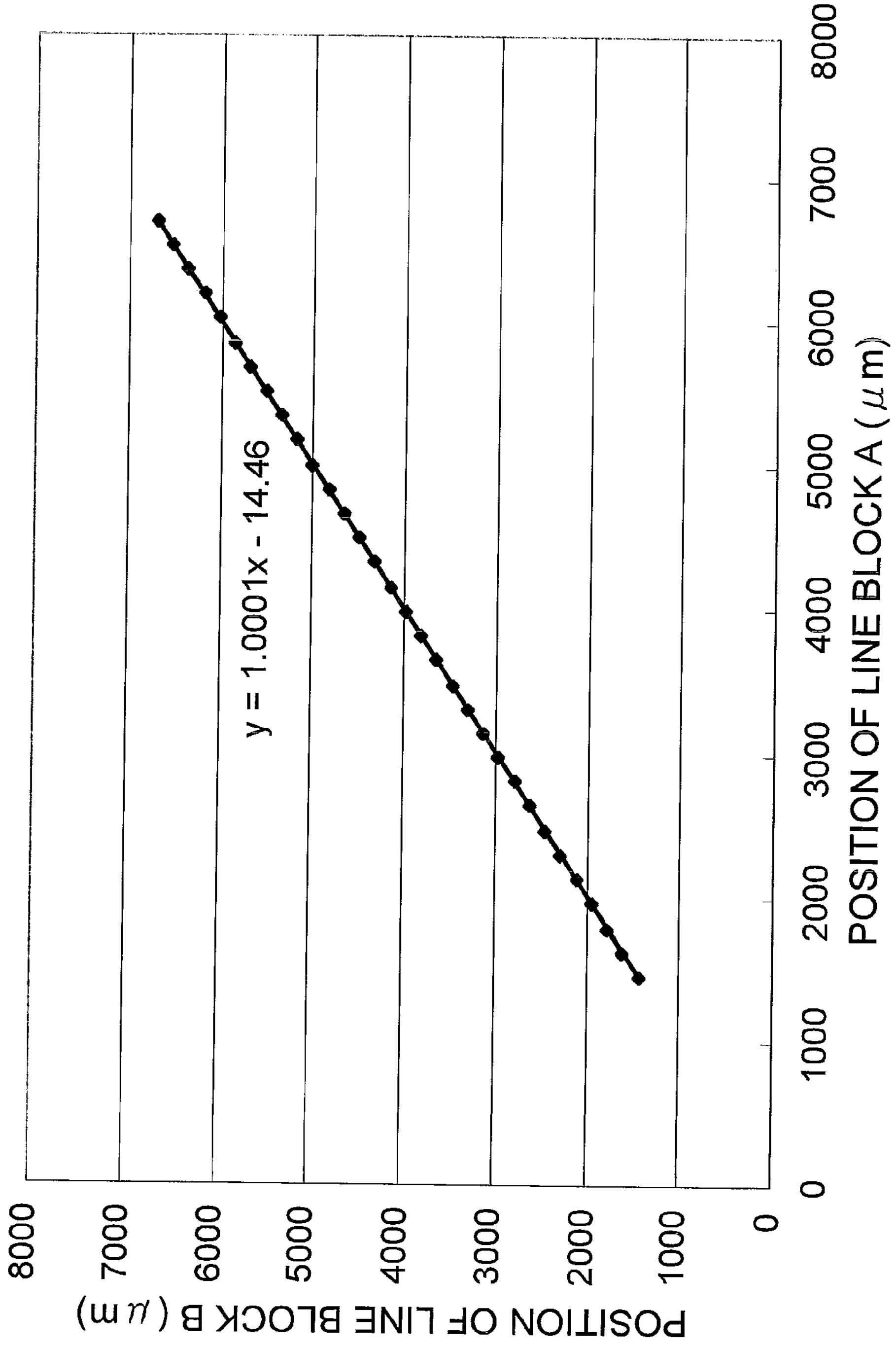
FIG.29 RELATED ART
FIG. 29 is a graph showing positional variation dependent on the scanner sub-scanning position.

A composition in which the functions of the dot position measurement apparatus 200 illustrated in FIG. 27 are incorporated in the inkjet recording apparatus is also possible. An embodiment in which a series of operations such as printing and then reading a measurement line pattern, and then performing dot position measurement by analyzing the image are carried out continuously by a control program of an inkjet recording apparatus, is also possible.

For example, a line sensor (print detection unit) for reading a print result may be provided downstream of the print unit 12 in the inkjet recording apparatus 10 illustrated in FIG. 1, and a measurement line pattern can be read with the line sensor.

In the respective embodiments described above, an inkjet recording apparatus using a page-wide full line type head having a nozzle row of a length corresponding to the entire width of the recording medium was described, but the scope of application of the present invention is not limited to this, and the present invention may also be applied to an inkjet recording apparatus which performs image recording by means of a plurality of head scanning actions which move a short recording head, such as a serial head (shuttle scanning head), or the like.

In the foregoing description, an inkjet recording apparatus with a recording head is described as one example of an image forming apparatus, but the scope of application of the present invention is not limited to this. It is also possible to apply the present invention to image forming apparatuses employing various types dot recording methods, apart from an inkjet apparatus, such as a thermal transfer recording apparatus equipped with a recording head which uses thermal elements (heaters) are recording elements, an LED electrophotographic printer equipped with a recording head having LED elements as recording elements, or a silver halide photographic printer having an LED line type exposure head, or the like.

Furthermore, the meaning of the term "image forming apparatus" is not restricted to a so-called graphic printing application for printing photographic prints or posters, but rather also encompasses industrial apparatuses which are able to form patterns that may be perceived as images, such as resist printing apparatuses, wire printing apparatuses for electronic circuit substrates, ultra-fine structure forming apparatuses, etc., which use inkjet technology.

In other words, the present invention can be applied broadly, as a dot impact (landing) position measurement technology, to various apparatuses (coating apparatus, spreading apparatus, application apparatus, line drawing apparatus, wiring drawing apparatus, fine structure forming apparatus, and so on) that eject a functional liquid or various other liquids toward a liquid receiving medium (recording medium) by using a liquid ejection head that functions as a recording head.

As can be seen from the description of embodiments of the present invention, described in detail hereinabove, this specification discloses various technological concepts including the following aspects of the invention.

One aspect of the present invention is directed to a dot position measurement method comprising: a line pattern formation step of recording dots on a recording medium continuously by a plurality of recording elements of a recording head while performing relative movement between the recording head and the recording medium in such a manner that a measurement line pattern including a plurality of lines of rows of the dots corresponding to the plurality of recording elements respectively is formed on the recording medium, the measurement line pattern having a plurality of line blocks including recording line blocks and a reference line block, each of the recording line blocks including a group of the lines recorded by the recording elements spaced by a prescribed distance in a direction in which the plurality of recording elements are substantially arranged and which is perpendicular to a direction of the relative movement of the recording head, the reference line block including a group of the lines recorded by the recording elements selected from the recording elements for each of the recording line blocks; a reading step of reading the measurement line pattern on the recording medium formed in the line pattern formation step with an image reading apparatus in a state where a longitudinal direction of the plurality of lines of the measurement line pattern are directed to a sub-scanning direction of the image reading apparatus in such a manner that an electronic image data indicating a read image of the measurement line pattern is acquired; a line block position determination step of determining positions of the respective lines in each of the plurality of line blocks according to the read image acquired in the reading step; and a position correction step of correcting the positions of the respective lines in each of the recording line blocks determined in the line block position determination step, according to the reference line block.

According to this aspect of the invention, the influence on disruption of the read image lattice caused by a change in the position of the carriage of the image reading apparatus can be reduced, and measurement in which the effect of paper deformation can be reduced is possible.

Desirably, the reference line block includes the lines recorded by the recording elements that are selected uniformly from the recording elements for each of the recording line blocks.

With a composition in which a reference line block including lines formed uniformly by the same recording elements for respective line blocks is disposed, the measurement position of each line block can be accurately corrected, with the reference line block serving as the reference point.

Desirably, a recording element number i (i=0, 1, 2, 3, . . . ) is assigned in series to the plurality of recording elements which form a substantial row aligned in a width direction perpendicular to the direction of the relative movement of the recording head, from one end of the substantial row, and the measurement line pattern includes the recording line blocks formed on the recording medium by differentiating recording timings of element groups of the plurality of recording elements that are determined by the recording element number based on AN+B, and the reference line block formed on the recording medium by the recording elements having the recording element number of CN+D where A is an integer more than one, B is an integer not less than 0 but not more than A−1, C is an integer more than one, is not A and does not have common divisors other than 1 with respect to A, D is an integer not less than 0 but not more than C−1, and N is an integer not less than 0.

According to this aspect of the invention, a plurality of line patterns which include lines corresponding to all the nozzles can be formed, and a reference line block including lines formed uniformly by the same recording elements for the respective line blocks can be formed.

Desirably, in the position correction step, the positions of the respective lines are corrected according to a correction function for matching the positions of the respective lines recorded by the same recording elements between the reference line block and the recording line blocks.

Furthermore, a zero-order function, a first-order function, or a $N_{th}$-order polynomial function, or the like, can be applied as the correction function.

Desirably, in the reading step, the measurement line pattern on the recording medium is read with the image reading apparatus in a state where a reading resolution in the sub-scanning direction of the image reading apparatus is lower than a reading resolution in the main scanning direction of the image reading apparatus in such a manner that the electronic image data indicating the read image of the measurement line pattern is acquired.

According to this aspect of the invention, because a measurement line pattern is read at a low resolution in the sub-scanning direction, the data capacity of the read image is small and the reading time is short. Furthermore, since the amount of data of the read image is small, the data processing time is reduced, and the processing load is suppressed, which is beneficial.

Desirably, the dot position measurement method comprises: a region allocating step of allocating a plurality of averaging regions where an image signal on the read image is averaged in terms of the sub-scanning direction, to different positions in terms of the sub-scanning direction of each of the plurality of line blocks that each include the lines arranged in the main scanning direction; an average profile image forming step of averaging the image signal in terms of the sub-scanning direction in each of the plurality of averaging regions that have been allocated to the different positions and creating average profile images for positions in terms of the main scanning direction; and an averaging region position determination step of determining positions of the lines in the plurality of averaging regions according to the average profile images, wherein in the line block position determination step, the positions of the respective lines in the plurality of line blocks are determined according to the positions of the lines in the plurality of averaging regions determined according to the average profile images corresponding to the plurality of averaging regions respectively.

According to this aspect of the invention, because line positions (that is, positions of dots recorded by the recording elements) are determined using a plurality of average profile images obtained from a plurality of averaging regions in different positions in the sub-scanning direction, dot position measurement which is highly accurate for the reading resolution can be achieved.

Desirably, the dot position measurement method comprises an edge position determination step of determining positions of both edges of each of the lines from the average profile images, wherein in the averaging region position determination step, the positions of the lines in the plurality of averaging regions are determined according to the positions of the both edges determined in the edge position determination step.

According to this aspect of the invention, line positions can be determined highly accurately.

Desirably, the dot position measurement method comprises a filtering step of performing a filtering process on the average profile images.

Of course, forming an average profile image for averaging the image signal in the sub-scanning direction has the effect of reducing irregular noise components caused by dirt or satellites, or the like; however, by also performing a filtering process on the average profile image, the effects of irregular noise components and sampling distortion can be reduced still further, whereby reliability of the line position measurement can be improved.

Desirably, the dot position measurement method comprises a tone value correction step of correcting tone values of the read image according to density values of a recording region where the dots are recorded and a non-recording region where the dots are not recorded on the recording medium.

According to this aspect of the invention, distortion of the profile image, caused by the effects of disruption of the recording paper, or the like, can be corrected, and also shading of the image reading apparatus can be reduced, thereby improving line position measurement accuracy.

Desirably, in the line pattern formation step, same at least one of the plurality of recording elements forms the lines in different positions on the recording medium, and the dot position measurement method comprises: a rotation angle determination step of determining a relative rotation angle between the measurement line pattern and the image reading apparatus according to positions of the lines formed in the different positions on the recording medium with the same at least one of the plurality of recording elements; and a rotation correction step of calculating rotation correction with respect to position information according to the relative rotation angle determined in the rotation angle determination step.

The relative rotation angle can be determined on the basis of the line positions of lines formed using the same recording element and spaced apart by a predetermined distance on the recording medium.

Another aspect of the invention is directed to a dot position measurement apparatus comprising: an image reading device for reading a measurement line pattern formed by recording dots on a recording medium continuously by a plurality of recording elements of a recording head while performing relative movement between the recording head and the recording medium, the measurement line pattern including a plurality of lines of rows of the dots corresponding to the plurality of recording elements respectively and having a plurality of line blocks that include recording line blocks and a reference line block, each of the recording line blocks including a group of the lines recorded by the recording elements spaced by a prescribed distance in a direction in which the plurality of recording elements are substantially arranged and which is perpendicular to a direction of the relative movement of the recording head, the reference line block including a group of the lines recorded by the recording elements selected from the recording elements for each of the recording line blocks, in such a manner that the image reading device reads the measurement line pattern in a state where a longitudinal direction of the plurality of lines of the measurement line pattern are directed to a sub-scanning direction of the image reading apparatus so that an electronic image data indicating a read image of the measurement line pattern is acquired; and a line block position determination device which determines positions of the respective lines in each of the plurality of line blocks according to the read image acquired by the image reading device; and a position correction device which corrects the positions of the respective lines in each of the recording line blocks determined by the line block position determination device, according to the reference line block.

Desirably, the image reading device is set in such a manner that a reading resolution in the sub-scanning direction of the image reading device is lower than a reading resolution in a main scanning direction of the image reading apparatus.

Desirably, the dot position measurement apparatus comprises: a region allocating device which allocates a plurality of averaging regions where an image signal on the read image is averaged in terms of the sub-scanning direction, to different positions in terms of the sub-scanning direction of each of the plurality of line blocks that each include the lines arranged in the main scanning direction; an average profile image forming device which averages the image signal in terms of the sub-scanning direction in each of the plurality of averaging regions that have been allocated to the different positions and creates average profile images for positions in terms of the main scanning direction; and an averaging region position determination device which determines positions of the lines in the plurality of averaging regions according to the average profile images, wherein the line block position determination device determines the positions of the respective lines in each of the plurality of line blocks according to the positions of the lines in the plurality of averaging regions determined according to the average profile images corresponding to the plurality of averaging regions respectively.

Desirably, the dot position measurement apparatus comprises an edge position determination device which determines positions of both edges of each of the lines from the average profile images, wherein the averaging region position determination device determines the positions of the lines in the plurality of averaging regions according to the positions of the both edges determined by the edge position determination device.

Desirably, the dot position measurement apparatus comprises a filtering device that performs a filtering process of the average profile images.

Desirably, the dot position measurement apparatus comprises a tone value correction device that corrects tone values of the read image according to density values of a recording region where the dots are recorded and a non-recording region where the dots are not recorded on the recording medium.

Desirably, same at least one of the plurality of recording elements forms the lines in different positions on the recording medium, and the dot position measurement apparatus comprises: a rotation angle determination device that determines a relative rotation angle between the measurement line pattern and the image reading apparatus according to positions of the lines formed in the different positions on the recording medium with the same at least one of the plurality of recording elements; and a rotation correction device that calculates rotation correction with respect to position information according to the relative rotation angle determined by the rotation angle determination device.

Another aspect of the invention is directed to a computer readable medium storing instructions causing a computer to function as the line block position determination device and the position correction device of any of the dot position measurement apparatuses.

Note that, in the program described above, an aspect can also be directed toward providing a program causing a computer to function as the region allocating device, the average profile image forming device, the averaging region position determination device described above, the edge position determination device described above, the filtering device described above, the tone value correction device described above, and the rotation angle determination device and the rotation correction device which are described above.

The program of the present invention can be adopted as an operating program of a CPU (central processing unit) incorporated in a printer or the like, or applied to a computer system such as a personal computer.

Alternatively, the program may be constituted as standalone application software, or integrated as part of another application such as image editing software. A program of this type can also be recorded on an information storage medium (external storage apparatus) such as a CD-ROM or magnetic disk and supplied to a third party via this information storage medium, or a program download service can be provided via a communication link such as the Internet.

Furthermore, an inkjet recording apparatus serving as one aspect of an image forming apparatus of the present invention for forming an image on a recording medium by using a recording head includes: a droplet ejection head (corresponding to the "recording head") which has a droplet ejection element array in which are arranged a plurality of droplet ejection elements (corresponding to the "recording elements") which each have a nozzle which ejects ink droplets for forming dots, and a pressure generating device (piezoelectric element or heating element or the like) for generating an ejection pressure; and an ejection control device which controls ejection of droplets from the recording head on the basis of ink ejection data generated from the image data, wherein an image is formed on the recording medium by the droplets ejected from the nozzle.

As an example of the composition of the recording head, a full line head with a recording element array in which are arranged a plurality of recording elements over a length corresponding to the entire width of the recording medium can be used. In this case, the composition may involve combining a plurality of comparatively short recording head modules which each have a recording element array not matching the length corresponding to the entire width of the recording element, such that, by linking the modules together, a recording element array is formed with a length corresponding to the entire width of the recording element.

A full line head is normally disposed along a direction orthogonal to the relative feed direction of the recording medium (relative conveyance direction), but the configuration may also be such that the recording head are arranged in an inclined direction at a certain predetermined angle to the direction orthogonal to the conveyance direction.

"Recording medium" encompasses various media that accept the recording of an image by the action of a recording head (for example, so-called, an image formation medium, printed medium, print-receiving medium, image-receiving medium, ejection-receiving medium or the like), such as spooled paper, cut paper, seal paper, an OHP sheet or other resin sheet, film, fabric, an intermediate transfer medium, and a print substrate on which a wiring pattern is printed by an inkjet recording apparatus, and the recording media may include other media regardless of shape and material.

"Conveyance device" encompasses an aspect where a recording medium is conveyed to a stopped (fixed) recording head, an aspect where a recording head is moved to a stopped recording medium, and an aspect where both the recording head and the recording medium are moved.

In cases where a color image is formed by an inkjet head, recording heads which each correspond each color of a plurality of inks (recording liquids) may be arranged, or inks of a plurality of colors may be ejected by one recording head.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A dot position measurement method comprising:

a line pattern formation step of recording dots on a recording medium continuously by a plurality of recording elements of a recording head while performing relative movement between the recording head and the recording medium in such a manner that a measurement line pattern including a plurality of lines of rows of the dots corresponding to the plurality of recording elements respectively is formed on the recording medium, the measurement line pattern having a plurality of line blocks including recording line blocks and a reference line block, each of the recording line blocks including a group of the lines recorded by the recording elements spaced by a prescribed distance in a direction in which the plurality of recording elements are substantially arranged and which is perpendicular to a direction of the relative movement of the recording head, the reference line block including a group of the lines recorded by the recording elements selected from the recording elements for each of the recording line blocks;

a reading step of reading the measurement line pattern on the recording medium formed in the line pattern formation step with an image reading apparatus in a state where a longitudinal direction of the plurality of lines of the measurement line pattern are directed to a sub-scanning direction of the image reading apparatus in such a manner that an electronic image data indicating a read image of the measurement line pattern is acquired;

a line block position determination step of determining positions of the respective lines in each of the plurality of line blocks according to the read image acquired in the reading step; and a position correction step of correcting the positions of the respective lines in each of the recording line blocks determined in the line block position determination step, according to the reference line block.

2. The dot position measurement method as defined in claim 1, wherein the reference line block includes the lines recorded by the recording elements that are selected uniformly from the recording elements for each of the recording line blocks.

3. The dot position measurement method as defined in claim 1, wherein:

a recording element number i (i=0, 1, 2, 3, . . . ) is assigned in series to the plurality of recording elements which form a substantial row aligned in a width direction perpendicular to the direction of the relative movement of the recording head, from one end of the substantial row, and the measurement line pattern includes the recording line blocks formed on the recording medium by differentiating recording timings of element groups of the plurality of recording elements that are determined by the recording element number based on AN+B, and the reference line block formed on the recording medium by the recording elements having the recording element number of CN+D where A is an integer more than one, B is an integer not less than 0 but not more than A−1, C is an integer more than one, is not A and does not have common divisors other than 1 with respect to A, D is an integer not less than 0 but not more than C−1, and N is an integer not less than 0.

4. The dot position measurement method as defined in claim 1, wherein in the position correction step, the positions of the respective lines are corrected according to a correction function for matching the positions of the respective lines recorded by the same recording elements between the reference line block and the recording line blocks.

5. The dot position measurement method as defined in claim 1, wherein in the reading step, the measurement line pattern on the recording medium is read with the image reading apparatus in a state where a reading resolution in the sub-scanning direction of the image reading apparatus is lower than a reading resolution in the main scanning direction of the image reading apparatus in such a manner that the electronic image data indicating the read image of the measurement line pattern is acquired.

6. The dot position measurement method as defined in claim 5, comprising:

a region allocating step of allocating a plurality of averaging regions where an image signal on the read image is averaged in terms of the sub-scanning direction, to different positions in terms of the sub-scanning direction of each of the plurality of line blocks that each include the lines arranged in the main scanning direction;

an average profile image forming step of averaging the image signal in terms of the sub-scanning direction in each of the plurality of averaging regions that have been allocated to the different positions and creating average profile images for positions in terms of the main scanning direction; and an averaging region position determination step of determining positions of the lines in the plurality of averaging regions according to the average profile images, wherein in the line block position determination step, the positions of the respective lines in the plurality of line blocks are determined according to the positions of the lines in the plurality of averaging regions determined according to the average profile images corresponding to the plurality of averaging regions respectively.

7. The dot position measurement method as defined in claim 6, comprising an edge position determination step of determining positions of both edges of each of the lines from the average profile images, wherein in the averaging region position determination step, the positions of the lines in the plurality of averaging regions are determined according to the positions of the both edges determined in the edge position determination step.

8. The dot position measurement method as defined in claim 6, comprising a filtering step of performing a filtering process on the average profile images.

9. The dot position measurement method as defined in claim 1, comprising a tone value correction step of correcting tone values of the read image according to density values of a recording region where the dots are recorded and a non-recording region where the dots are not recorded on the recording medium.

10. The dot position measurement method as defined in claim 1, wherein:

in the line pattern formation step, same at least one of the plurality of recording elements forms the lines in different positions on the recording medium, and the dot position measurement method comprises:

a rotation angle determination step of determining a relative rotation angle between the measurement line pattern and the image reading apparatus according to positions of the lines formed in the different positions on the recording medium with the same at least one of the plurality of recording elements; and a rotation correction step of calculating rotation correction with respect to position information according to the relative rotation angle determined in the rotation angle determination step.

11. A dot position measurement apparatus comprising:

an image reading device for reading a measurement line pattern formed by recording dots on a recording medium continuously by a plurality of recording elements of a recording head while performing relative movement between the recording head and the recording medium, the measurement line pattern including a plurality of lines of rows of the dots corresponding to the plurality of recording elements respectively and having a plurality of line blocks that include recording line blocks and a reference line block, each of the recording line blocks including a group of the lines recorded by the recording elements spaced by a prescribed distance in a direction in which the plurality of recording elements are substantially arranged and which is perpendicular to a direction of the relative movement of the recording head, the reference line block including a group of the lines recorded by the recording elements selected from the recording elements for each of the recording line blocks, in such a manner that the image reading device reads the measurement line pattern in a state where a longitudinal direction of the plurality of lines of the measurement line pattern are directed to a sub-scanning direction of the image reading apparatus so that an electronic image data indicating a read image of the measurement line pattern is acquired; and a line block position determination device which determines positions of the respective lines in each of the plurality of line blocks according to the read image acquired by the image reading device; and a position correction device which corrects the positions of the respective lines in each of the recording line blocks determined by the line block position determination device, according to the reference line block.

12. The dot position measurement apparatus as defined in claim 11, wherein the image reading device is set in such a manner that a reading resolution in the sub-scanning direction of the image reading device is lower than a reading resolution in a main scanning direction of the image reading apparatus.

13. The dot position measurement apparatus as defined in claim 12, comprising:

a region allocating device which allocates a plurality of averaging regions where an image signal on the read image is averaged in terms of the sub-scanning direction, to different positions in terms of the sub-scanning direction of each of the plurality of line blocks that each include the lines arranged in the main scanning direction;

an average profile image forming device which averages the image signal in terms of the sub-scanning direction in each of the plurality of averaging regions that have been allocated to the different positions and creates average profile images for positions in terms of the main scanning direction; and an averaging region position determination device which determines positions of the lines in the plurality of averaging regions according to the average profile images, wherein the line block position determination device determines the positions of the respective lines in the plurality of line blocks according to the positions of the lines in the plurality of averaging regions determined according to the average profile images corresponding to the plurality of averaging regions respectively.

14. The dot position measurement apparatus as defined in claim 13, comprising an edge position determination device which determines positions of both edges of each of the lines from the average profile images, wherein the averaging region position determination device determines the positions of the lines in the plurality of averaging regions according to the positions of the both edges determined by the edge position determination device.

15. The dot position measurement apparatus as defined in claim 13, comprising a filtering device that performs a filtering process of the average profile images.

16. The dot position measurement apparatus as defined in claim 11, comprising a tone value correction device that corrects tone values of the read image according to density values of a recording region where the dots are recorded and a non-recording region where the dots are not recorded on the recording medium.

17. The dot position measurement apparatus as defined in claim 11, wherein:

same at least one of the plurality of recording elements forms the lines in different positions on the recording medium, and the dot position measurement apparatus comprises:

a rotation angle determination device that determines a relative rotation angle between the measurement line pattern and the image reading apparatus according to positions of the lines formed in the different positions on the recording medium with the same at least one of the plurality of recording elements; and a rotation correction device that calculates rotation correction with respect to position information according to the relative rotation angle determined by the rotation angle determination device.

18. A non-transitory computer readable medium storing instructions causing a computer to function as the line block position determination device and the position correction device of the dot position measurement apparatus as defined in claim 11.

* * * * *